(12) United States Patent
Yamada

(10) Patent No.: US 10,805,498 B2
(45) Date of Patent: Oct. 13, 2020

(54) PRINTING SYSTEM, AND SET AND COMPUTER-READABLE MEDIUM THEREFOR

(71) Applicant: BROTHER KOGYO KABUSHIKI KAISHA, Nagoya, Aichi (JP)

(72) Inventor: Kazutaka Yamada, Nagakute (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 16/366,467

(22) Filed: Mar. 27, 2019

(65) Prior Publication Data

US 2019/0222709 A1    Jul. 18, 2019

Related U.S. Application Data

(63) Continuation of application No. 16/056,833, filed on Aug. 7, 2018, now Pat. No. 10,277,768, which is a
(Continued)

(30) Foreign Application Priority Data

Jan. 29, 2016    (JP) ................. 2016-015436

(51) Int. Cl.
*H04N 1/00* (2006.01)
*H04N 1/32* (2006.01)
(Continued)

(52) U.S. Cl.
CPC ...... *H04N 1/00973* (2013.01); *B41J 13/0009* (2013.01); *G06F 3/1221* (2013.01);
(Continued)

(58) Field of Classification Search
None
See application file for complete search history.

(56) References Cited

U.S. PATENT DOCUMENTS

| 6,268,925 B1 | 7/2001 | Yamanaka |
| 10,069,994 B2 * | 9/2018 | Yamada ............... H04N 1/0057 |

(Continued)

FOREIGN PATENT DOCUMENTS

| JP | H11-5350 A | 1/1999 |
| JP | 2002-046293 A | 2/2002 |
| JP | 2014-063243 A | 4/2014 |

OTHER PUBLICATIONS

United States Notice of Allowance dated May 9, 2018 received in related U.S. Appl. No. 15/417,404.
(Continued)

*Primary Examiner* — Dov Popovici
(74) *Attorney, Agent, or Firm* — Scully Scott Murphy and Presser

(57) ABSTRACT

A printing system includes a printer and an information processing device that includes a processor and a memory storing processor-executable instructions, the instructions being configured to, when executed by the processor, cause the processor to accept a print instruction, in response to accepting the print instruction, determine whether to instruct the printer to start a pre-printing operation based on preparation instruction information, in response to determining to instruct the printer to start the pre-printing operation, transmit the preparation instruction information to the printer, in response to determining to instruct the printer to start the pre-printing operation and transmitting the preparation instruction information to the printer, generate print data based on specified contents data, and transmit print instruction information to the printer.

11 Claims, 11 Drawing Sheets

Related U.S. Application Data continuation of application No. 15/417,404, filed on Jan. 27, 2017, now Pat. No. 10,069,994.

(51) Int. Cl.
*B41J 13/00* (2006.01)
*G06F 3/12* (2006.01)

(52) U.S. Cl.
CPC .......... *G06F 3/1229* (2013.01); *G06F 3/1285* (2013.01); *H04N 1/0057* (2013.01); *H04N 1/00204* (2013.01); *H04N 1/00891* (2013.01); *H04N 1/32117* (2013.01); *H04N 2201/0039* (2013.01); *H04N 2201/0094* (2013.01); *Y02D 10/1592* (2018.01)

(56) References Cited

U.S. PATENT DOCUMENTS

| | | | |
|---|---|---|---|
| 10,277,768 B2 * | 4/2019 | Yamada | ............. H04N 1/00204 |
| 2001/0043249 A1 | 11/2001 | Tabuchi | |
| 2004/0184081 A1 | 9/2004 | Yamamoto | |
| 2014/0078540 A1 | 3/2014 | Ishida | |
| 2017/0220909 A1 | 8/2017 | Yamada | |
| 2017/0223211 A1 | 8/2017 | Yamada | |

OTHER PUBLICATIONS

United States Office Action dated Dec. 14, 2017 received in related U.S. Appl. No. 15/417,404.

United States Notice of Allowance dated May 23, 2018 received in related U.S. Appl. No. 15/417,411.

United States Notice of Allowance dated Dec. 17, 2018 received in related U.S. Appl. No. 16/056,833.

Japanese Office Action dated Jun. 4, 2019 in Japanese Patent Application No. 2016-015436.

* cited by examiner

| PUBLIC INFORMATION | SIZE INFORMATION | A4 |
|---|---|---|
| | COLOR INFORMATION | COLOR |
| PRIVATE INFORMATION | TRAY INFORMATION | TRAY 1 |
| | SHEET INFORMATION | PLAIN PAPER |
| | MARGIN INFORMATION | MARGINED |
| | SECURE FLAG | ON |
| | AUTHENTICATION INFORMATION | 1234 |

PRINTING SYSTEM, AND SET AND COMPUTER-READABLE MEDIUM THEREFOR

CROSS-REFERENCE TO RELATED APPLICATION

This application is a continuation of, U.S. Ser. No. 16/056,833 filed Aug. 7, 2018 and U.S. Ser. No. 15/417,404 filed Jan. 27, 2017, now U.S. Pat. No. 10,069,994 granted on Sep. 4, 2018, which claims priority under 35 U.S.C. § 119 from Japanese Patent Application No. 2016-015436 filed on Jan. 29, 2016. The entire subject matter of each of which is incorporated herein by reference.

BACKGROUND

Technical Field

The following description relates to one or more aspects of a printing system, and a set and a non-transitory computer-readable medium therefor.

Related Art

Heretofore, a computer program has been known that, when executed by a computer, causes the computer to transmit, to a printer via a communication network, an instruction to cause the printer to perform a pre-printing operation in advance of an instruction to cause the printer to perform a printing operation. The pre-printing operation is performed to ensure a desired level of quality of the printing operation. For instance, in response to particular conditions being satisfied, the known computer program, launched by an operating system (hereinafter, which may be referred to as an "OS"), may cause the computer to transmit to the printer an auto-wakeup command to instruct the printer to perform the pre-printing operation. For example, the particular conditions may include a condition that an output port of the printer is in a ready state and a condition that a particular time or longer has elapsed since the last data transmission to the printer.

SUMMARY

However, the known computer program has the following problem. Specifically, in response to the aforementioned particular conditions being satisfied, the computer program causes the computer to transmit the auto-wakeup command to the printer regardless of whether the computer program actually causes the printer to execute the printing operation. Namely, according to the known computer program, even though the printer does not actually execute the printing operation, the printer might perform the pre-printing operation. Thereby, it might result in wasteful consumption of ink and/or electric power in the printer.

Aspects of the present disclosure are advantageous to provide one or more improved techniques that make it possible to provide an instruction to cause a printer to perform a pre-printing operation at appropriate timing.

According to aspects of the present disclosure, a printing system is provided that includes a printer and an information processing device. The information processing device includes a first communication interface, a processor, and a memory. The memory stores processor-executable instructions configured to, when executed by the processor, cause the processor to perform a print instruction accepting process including accepting a print instruction from an operating system of the information processing device, the print instruction representing that an instruction to cause the printer to perform a printing operation has been input by a user, perform a determining process in response to accepting the print instruction, the determining process including determining whether to instruct the printer to start a pre-printing operation based on preparation instruction information, the pre-printing operation being an operation to be performed by the printer to record an image with particular quality on a sheet in the printing operation, the preparation instruction information being information to be transmitted to the printer in advance of an instruction to cause the printer to perform the printing operation, perform a preparation instruction process in response to determining to instruct the printer to start the pre-printing operation, the preparation instruction process including transmitting the preparation instruction information to the printer via the first communication interface, perform a generating process in response to determining to instruct the printer to start the pre-printing operation and performing the preparation instruction process, the generating process including generating print data based on specified contents data, and perform a print instruction process including transmitting print instruction information to the printer via the first communication interface, the print instruction information being for instructing the printer to perform the printing operation based on the generated print data. The printer includes an operating unit configured to perform the pre-printing operation and the printing operation, a second communication interface, and a controller configured to perform a preparation instruction receiving process including receiving the preparation instruction information from the information processing device via the second communication interface, perform a pre-printing process in response to receiving the preparation instruction information, the pre-printing process including controlling the operating unit to perform the pre-printing operation, perform a print instruction receiving process including receiving the print instruction information from the information processing device via the second communication interface, and perform a print process in response to receiving the print instruction information and terminating the pre-printing process, the print process including controlling the operating unit to perform the printing operation in accordance with the print instruction information.

According to aspects of the present disclosure, further provided is a set including a printer and a non-transitory computer-readable medium. The medium stores computer-readable instructions that are executable by a computer coupled with a first communication interface. The instructions are configured to, when executed by the computer, cause the computer to perform a print instruction accepting process including accepting a print instruction from an operating system of the computer, the print instruction representing that an instruction to cause the printer to perform a printing operation has been input by a user, perform a determining process in response to accepting the print instruction, the determining process including determining whether to instruct the printer to start a pre-printing operation based on preparation instruction information, the pre-printing operation being an operation to be performed by the printer to record an image with particular quality on a sheet in the printing operation, the preparation instruction information being information to be transmitted to the printer in advance of an instruction to cause the printer to perform the printing operation, perform a preparation instruction process in response to determining to instruct the printer to start the pre-printing operation, the preparation instruction process including transmitting the preparation instruction information to the printer via the first communication interface, perform a generating process in response to determining to instruct the printer to start the pre-printing operation and performing the preparation instruction process, the generating process including generating print data based on specified contents data, and perform a print instruction process including transmitting print instruction information to the printer via the first communication interface, the print instruction information being for instructing the printer to perform the printing operation based on the generated print data. The printer includes an operating unit configured to perform the pre-printing operation and the printing operation, a second communication interface, and a controller configured to perform a preparation instruction receiving process including receiving the preparation instruction information from the computer via the second communication interface, perform a pre-printing process in response to receiving the preparation instruction information, the pre-printing process including controlling the operating unit to perform the pre-printing operation, perform a print instruction receiving process including receiving the print instruction information from the computer via the second communication interface, and perform a print process in response to receiving the print instruction information and terminating the pre-printing process, the print process including controlling the operating unit to perform the printing operation in accordance with the print instruction information.

According to aspects of the present disclosure, further provided is a non-transitory computer-readable medium storing computer-readable instructions that are executable by a processor coupled with an information processing device. The instructions are configured to, when executed by the processor, cause the processor to perform a print instruction accepting process including accepting a print instruction from an operating system of the information processing device, the print instruction representing that an instruction to cause a printer to perform a printing operation has been input by a user, perform a first determining process in response to accepting the print instruction, the first determining process including determining whether to instruct the printer to start a pre-printing operation based on preparation instruction information, the pre-printing operation being an operation to be performed by the printer to record an image with particular quality on a sheet in the printing operation, the preparation instruction information being information to be transmitted to the printer in advance of an instruction to cause the printer to perform the printing operation, perform a preparation instruction process in response to determining to instruct the printer to start the pre-printing operation, the preparation instruction process including transmitting the preparation instruction information to the printer via a communication interface of the information processing device, perform a generating process in response to determining to instruct the printer to start the pre-printing operation and performing the preparation instruction process, the generating process including generating print data based on specified contents data, and perform a print instruction process including transmitting print instruction information to the printer via the communication interface, the print instruction information including information for instructing the printer to perform the printing operation based on the generated print data.

BRIEF DESCRIPTION OF THE ACCOMPANYING DRAWINGS

FIG. 1A schematically shows a configuration of a printing system in an illustrative embodiment according to one or more aspects of the present disclosure.

Figure 9:
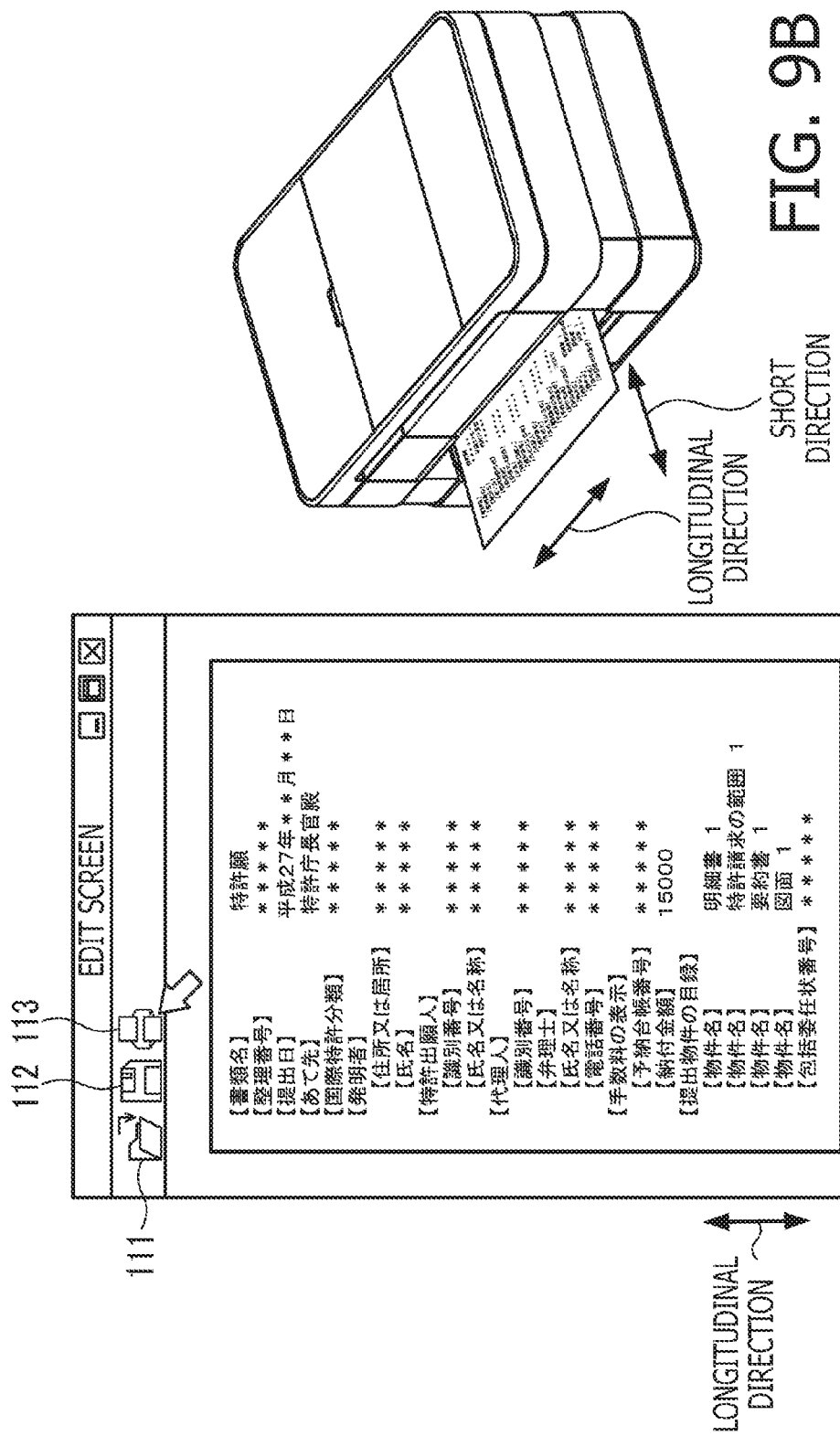

FIG. 9A exemplifies an edit screen displayed on a display of the information processing terminal in the illustrative embodiment according to one or more aspects of the present disclosure.

FIG. 9B shows a state in which a sheet is discharged from the printer in the illustrative embodiment according to one or more aspects of the present disclosure.

Figure 10:
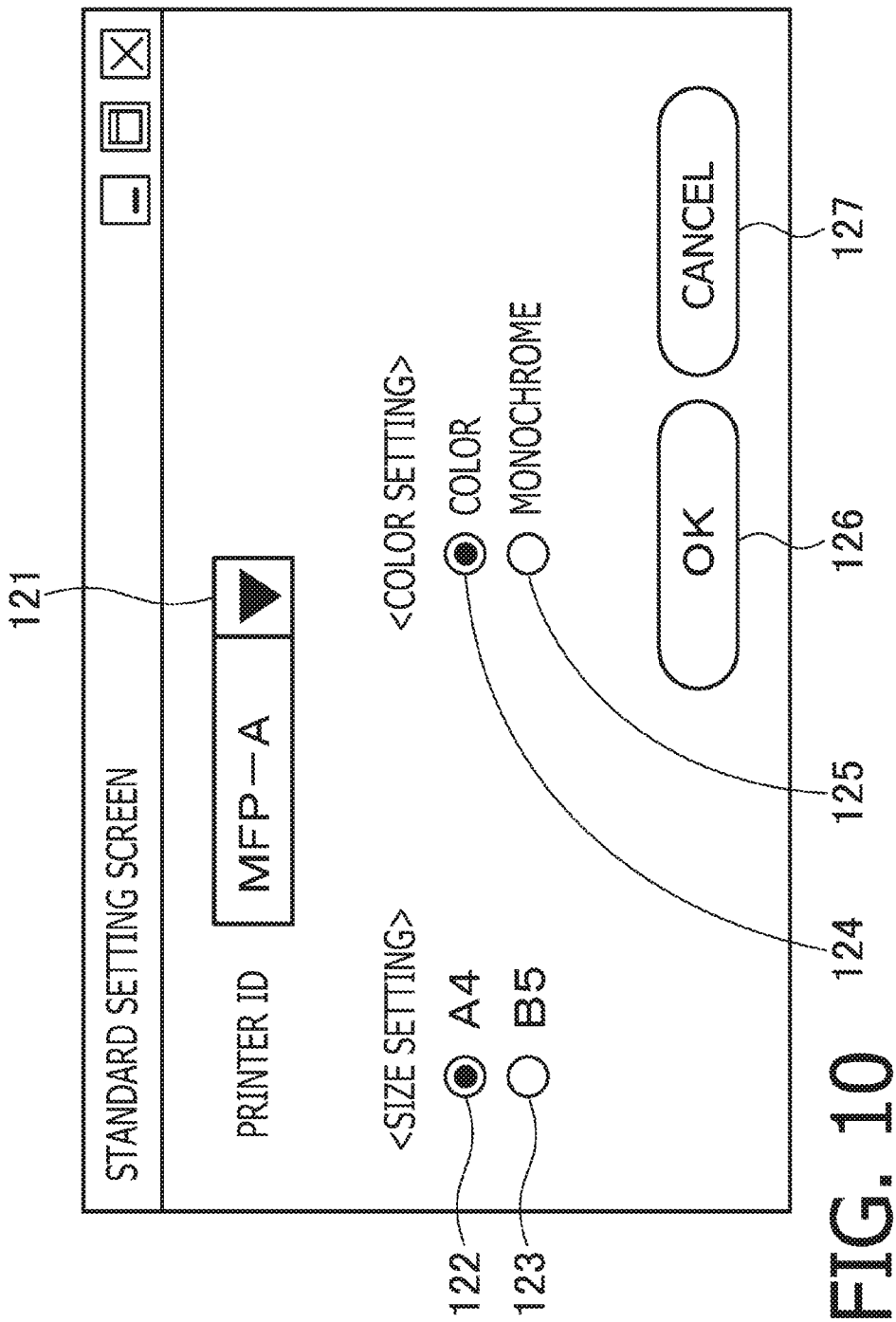

FIG. 10 exemplifies a standard setting screen displayed on the display of the information processing terminal in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1A:
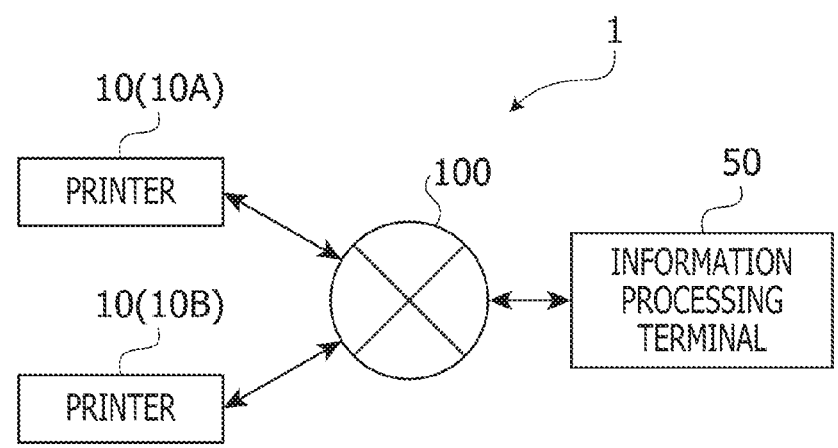
FIG. 1B is a block diagram schematically showing an electrical configuration of a printer included in the printing system in the illustrative embodiment according to one or more aspects of the present disclosure.

Hereinafter, an illustrative embodiment according to aspects of the present disclosure will be described with reference to the accompanying drawings. As shown in FIG. 1A, for instance, a printing system 1 of the illustrative embodiment includes a printer 10 (see FIG. 1B) and an information processing terminal 50 (see FIG. 2A). The printer 10 and the information processing terminal 50 are configured to communicate with each other via a communication network 100. For example, the communication network 100 may include, but is not limited to, a wired LAN, a wireless LAN, and a USB cable. Further, for instance, as shown in FIG. 1A, the printing system 1 may include a plurality of printers 10A and 10B. Namely, as shown in FIG. 3A, the information processing terminal 50 may be communicable with the plurality of printers 10A and 10B.

Figure 1B:
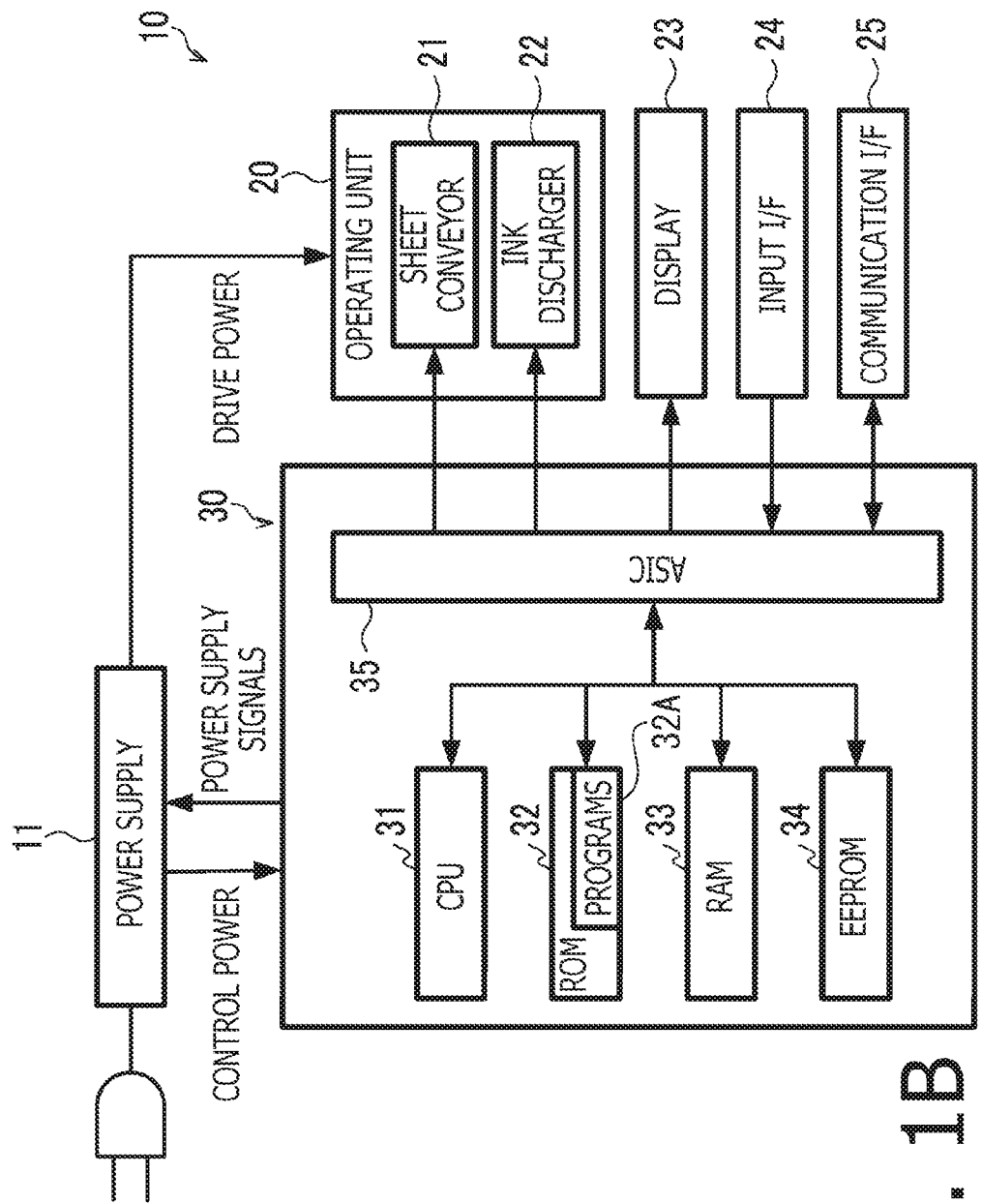

For instance, a maker or a vendor provides a user with a set of the printer 10 shown in FIG. 1B and a driver program 66 installable in the information processing terminal 50. Then, when the driver program 66 is installed into the information processing terminal 50 by the user, the printing system 1 of the illustrative embodiment is established. For instance, the driver program 66 may be provided to the user in a form stored in a CD-ROM contained in a package of the printer 10, or may be downloadable from a website of the maker or the vendor. The driver program 66 may be an example of processor-executable instructions, computer-readable instructions, or a specific program according to aspects of the present disclosure.

As shown in FIG. 1B, the printer 10 includes a power supply 11, an operating unit 20, a display 23, an input I/F ("I/F" is an abbreviated form of interface) 24, a communication I/F 25, and a controller 30. Elements included in the printer 10 are interconnected via a communication bus. In the illustrative embodiment, the printer 10 is exemplified as an inkjet printer. Nonetheless, a recording method of the printer 10 is not limited to the inkjet method but may include any of known methods such as an electrophotographic method. The printers 10A and 10B shown in FIG. 3A may have substantially the same configuration as exemplified in FIG. 1B.

The power supply 11 is configured to supply each element included in the printer 10 with an electric power supplied from an external power source via a power plug. Specifically, the power supply 11 outputs an electric power received from the external power source to the operating unit 20 as a drive power (e.g., 24 V) and to the controller 30 as a control power (e.g., 5V). Further, although the following features are not shown in any drawings, the power supply 11 is further configured to supply an electric power to the display 23, the input I/F 24, and the communication I/F 25.

Further, the power supply 11 is switchable between a drive state and a dormant state in accordance with a power supply signal output from the controller 30. More specifically, the controller 30 switches the power supply 11 from the dormant state to the drive state by outputting a power supply signal of a "HIGH" level (e.g., 5V). Further, the controller 30 switches the power supply 11 from the drive state to the dormant state by outputting a power supply signal of a "LOW" level (e.g., 0V).

The drive state is a state where the power supply 11 is outputting the drive power to the operating unit 20. In other words, the drive state is a state where the operating unit 20 is enabled to operate. The dormant state is a state where the power supply 11 is not outputting the drive power to the operating unit 20. In other words, the dormant state is a state where the operating unit 20 is not enabled to operate. In the meantime, the power supply 11 outputs the control power to the controller 30 regardless of whether the power supply 11 is in the drive state or the dormant state. Further, although the following features are not shown in any drawings, the input I/F 24 is configured to output an operation signal according to a user operation, regardless of whether the power supply 11 is in the drive state or the dormant state. Moreover, the communication I/F 25 is configured to receive information from external devices regardless of whether the power supply 11 is in the drive state or the dormant state.

The operating unit 20 performs a printing operation and pre-printing operations in accordance with instructions from the controller 30. The printing operation is an operation of recording an image on a sheet. The pre-printing operations are operations to be performed in advance of the printing operation so as to record the image with particular quality on the sheet in the printing operation. The printing operation and the pre-printing operations will be described in detail below. As shown in FIG. 1B, the operating unit 20 includes a sheet conveyor 21 and an ink discharger 22.

The sheet conveyor 21 is configured to convey a sheet placed on a feed tray (not shown) in a conveyance direction. For instance, the sheet conveyor 21 includes a plurality of rollers configured to rotate in response to receiving a driving force from a motor (not shown). The plurality of rollers driven by the motor convey the sheet placed on the feed tray to a position to face the ink discharger 22, and discharge the sheet with an image recorded thereon by the ink discharger 22 outside the printer 10. The printer 10 may have a plurality of feed trays.

The ink discharger 22 is configured to move along a main scanning direction perpendicular to the conveyance direction, in a position where the ink discharger 22 faces the sheet being conveyed by the sheet conveyor 21. The ink discharger 22 moves along the main scanning direction in response to receiving the driving force from the motor (not shown). In a lower surface of the ink discharger 22, a nozzle surface is formed with a plurality of nozzles arranged therein. The ink discharger 22 discharges ink droplets from the nozzles.

When ink droplets, which are discharged from the ink discharger 22 while the ink discharger 22 is moving along the main scanning direction, land on the sheet, an image is recorded on the sheet. An area on the sheet within which ink droplets discharged from the ink discharger 22 during the movement of the ink discharger 22 from one side to the other side along the main scanning direction are allowed to land may be referred to as a "recording area." The sheet is sectioned into a plurality of recording areas. In a below-mentioned printing operation, the ink discharger 22 sequentially records an image in each of the plurality of recording areas.

For example, the display 23 may include, but is not limited to, a liquid crystal display, an organic electroluminescence display, and the like. The display 23 has a display screen for displaying various kinds of information.

The input I/F 24 is configured to accept an input operation by the user. Specifically, the input I/F 24 includes operable buttons, and is configured to, when one of the buttons is pressed, transmit an operation signal corresponding to the pressed button to a CPU 31. Further, the input I/F 24 may include a membranous touch sensor superimposed on the display screen of the display 23.

The touch sensor of the input I/F 24 is configured to output positional information indicating a position on the display screen that the user has touched. According to aspects of the present disclosure, "touching" may include, but is not limited to, every operation of bringing an input medium into touch with the display screen. Further, "touching" may conceptionally include an operation of bringing the input medium in proximity to the display screen. Namely, in this case, the input medium may not necessarily be brought into contact with the display screen. Further, the input medium may include, but is not limited to, a finger of the user, a stylus, a touch pen, and the like.

The communication I/F 25 is configured to communicate with external devices via the communication network 100. Namely, the printer 10 transmits various kinds of information to external devices via the communication I/F 25, and receives various kinds of information from external devices via the communication I/F 25. For instance, the communication I/F 25 may be an interface for communicating wireless signals in accordance with a wireless communication protocol based on Wi-Fi (trademark) standards or may be an interface connectable with a LAN cable and/or a USB cable.

The controller 30 is configured to take overall control of the printer 10. As shown in FIG. 1B, the controller 30 is a microcomputer including the CPU 31, a ROM 32, a RAM 33, an EEPROM 34, and an ASIC 35.

The ROM 32 stores therein computer programs 32A for the CPU 31 to control operations of the printer 10. The RAM 33 is used as a storage area and/or a work area to temporarily store various kinds of data used when the CPU 31 executes the computer programs 32A stored in the ROM 32. The EEPROM 34 stores therein settings and flags to be held even after the printer 10 is turned off. The CPU 31 controls operations of the printer 10 by executing the computer programs 32A read out from the ROM 32. The ASIC 35 is connected with the sheet conveyor 21, the ink discharger 22, the display 23, the input I/F 24, and the communication I/F 25. The ASIC 35 is configured to operate each of elements included in the printer 10 in accordance with instructions from the CPU 31.

The ROM 32, the RAM 33, and the EEPROM 34 may be replaced with computer-readable storage media. The computer-readable storage media may include non-transitory media. The non-transitory media may include recording media such as CD-ROMs and DVD-ROMs other than the aforementioned examples. Further, the non-transitory media may include tangible media. On the other hand, electric signals carrying programs downloaded from a server on the Internet are computer-readable signal media, which are included in computer-readable media but not included in the non-transitory computer-readable media. The same applies to a below-mentioned memory 62 of the information processing terminal 50.

The ASIC 35 outputs a drive signal to the motor (not shown). When the motor rotates, the sheet conveyor 21 conveys a sheet, and the ink discharger 22 moves in the main scanning direction. The ASIC 35 outputs a drive signal to a drive element such as a piezoelectric element. When the drive element vibrates, the ink discharger 22 discharges ink droplets from the nozzles. The ASIC 32 outputs an image signal to the display 23 and causes the display 23 to display a screen image thereon. The ASIC 35 acquires an operation signal from the input I/F 24. The ASIC 35 receives information from an external device via the communication I/F 25, and transmits information to an external device via the communication I/F 25.

Figures 2A, 2B:
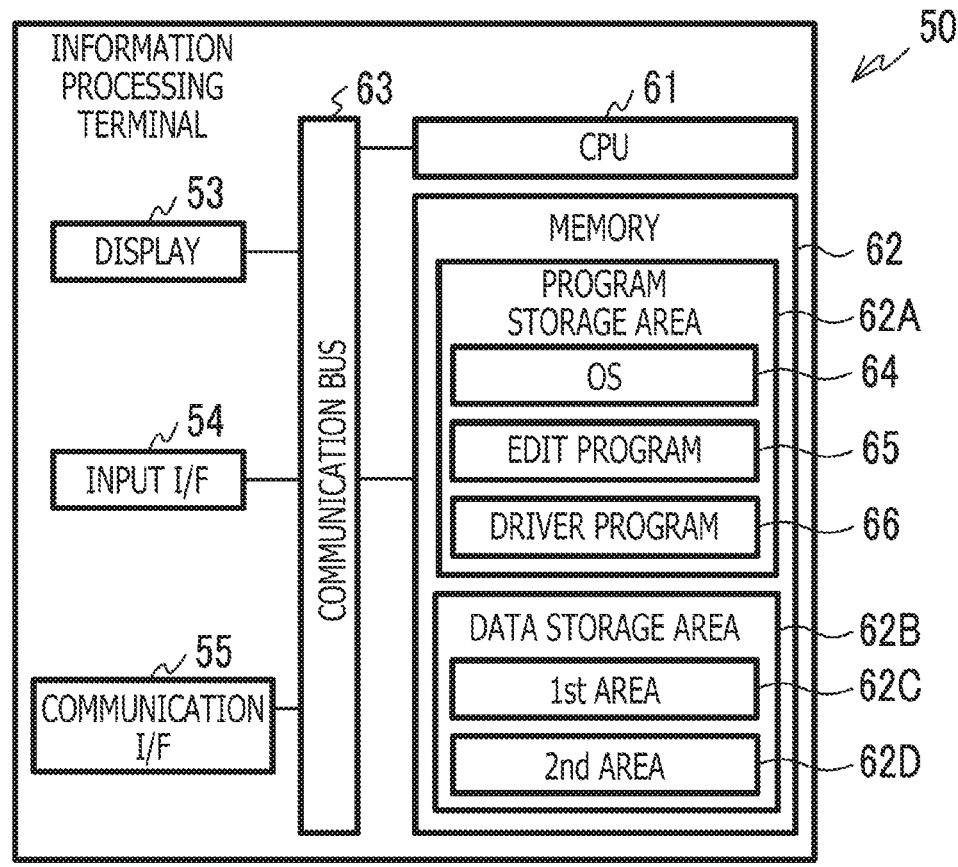
FIG. 2A is a block diagram schematically showing an electrical configuration of an information processing terminal included in the printing system in the illustrative embodiment according to one or more aspects of the present disclosure.
FIG. 2B shows condition information stored in a data storage area of the information processing terminal in the illustrative embodiment according to one or more aspects of the present disclosure.
Figures 3A, 3B, 3C:
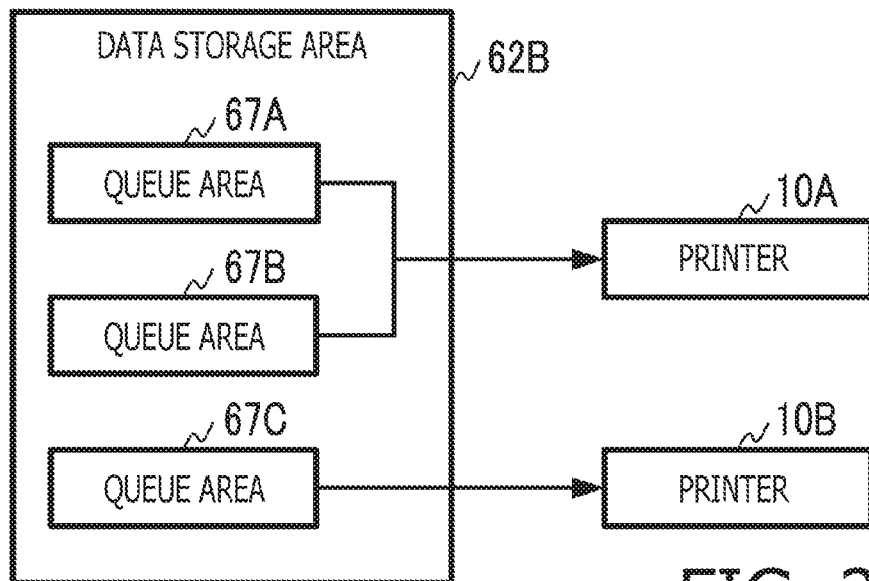
FIG. 3A shows a correspondence relationship between printers and queue areas of the data storage area in the illustrative embodiment according to one or more aspects of the present disclosure.
FIG. 3B shows a particular one of the queue areas in which print instruction information is stored, in the illustrative embodiment according to one or more aspects of the present disclosure.
FIG. 3C shows the particular queue area in which preparation instruction information is stored, in the illustrative embodiment according to one or more aspects of the present disclosure.
Figure 4:
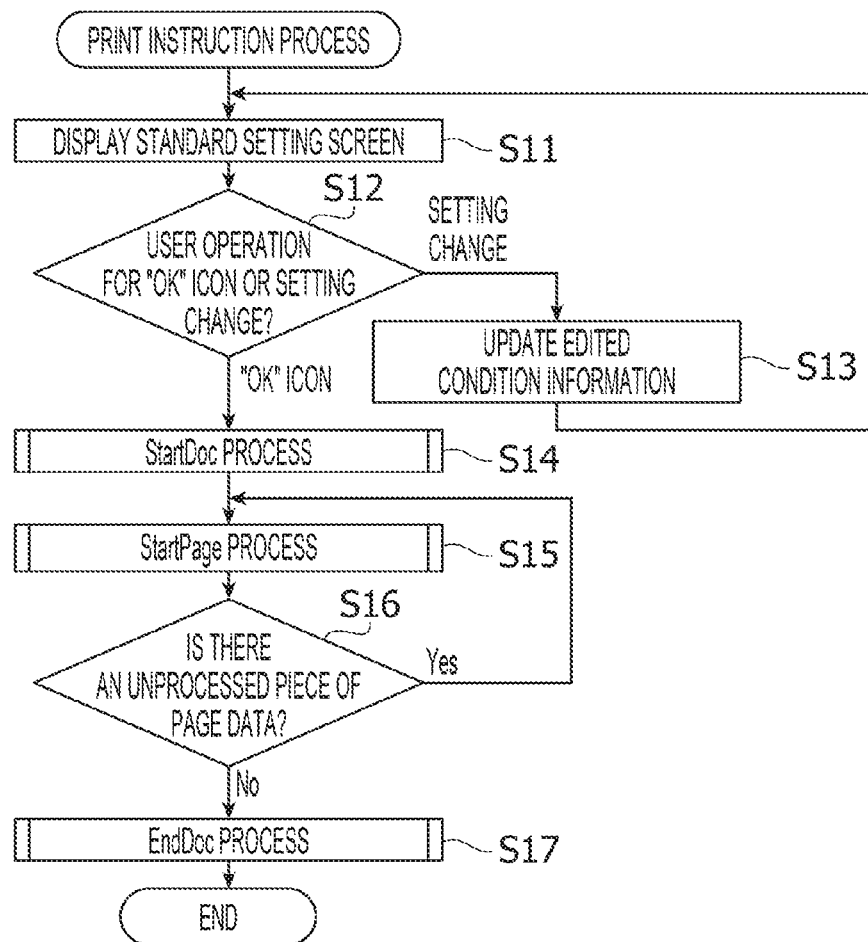
FIG. 4 is a flowchart showing a procedure of a print instruction process to be executed by the information processing terminal in the illustrative embodiment according to one or more aspects of the present disclosure.

As shown in FIG. 2A, the information processing terminal 50 includes a display 53, an input I/F 54, a communication I/F 55, a CPU 61, a memory 62, and a communication bus 63. The display 53, the input I/F 54, the communication I/F 55, and the CPU 61 included in the information processing terminal 50 are configured substantially in the same manner as the display 23, the input I/F 24, the communication I/F 25, and the CPU 31 included in the printer 10, respectively. Therefore, explanations of the display 53, the input I/F 54, the communication I/F 55, and the CPU 61 will be omitted.

For instance, the information processing terminal 50 may include, but is not limited to, a mobile phone, a smartphone, a tablet terminal, a personal computer, and the like. For instance, the input I/F 54 of the information processing terminal 50 may include a combination of a mouse and a keyboard.

For instance, the memory 62 may include at least one of a RAM, a ROM, an EEPROM, an HDD, a portable storage medium (e.g., a USB memory) detachably attached to the information processing terminal 50, a buffer of the CPU 61, and a combination including at least two of the above-cited storage media. The memory 62 includes a program storage area 62A and a data storage area 62B. In the program storage area 62A, an OS 64, and an edit program 65, and a driver program 66 are installed. Each program stored in the program storage area 62A may be a single program or an aggregate of a plurality of programs. In the data storage area 62B, data and/or information necessary for execution of each program stored in the program storage area 62A is stored.

In the illustrative embodiment, Windows (trademark) OS is specifically exemplified as the OS 64. Nonetheless, the OS 64 may include, but is not limited to, Android (trademark) OS and iOS (trademark), as well as Windows OS.

The edit program 65 is a program for editing contents data in accordance with user operations. As exemplified in FIG. 9A, the edit program 65 causes the display 53 to display an image represented by specified contents data, accepts user operations to provide an instruction to edit the contents data via the input I/F 54, and edits the contents data in accordance with the accepted user operations. Exemplary formats of the contents data may include, but are not limited to, a text format, an image format, a spreadsheet format, and a presentation format. The contents data may contain at least one piece of page data. A piece of page data represents contents to be recorded on a single sheet.

Figure 5:
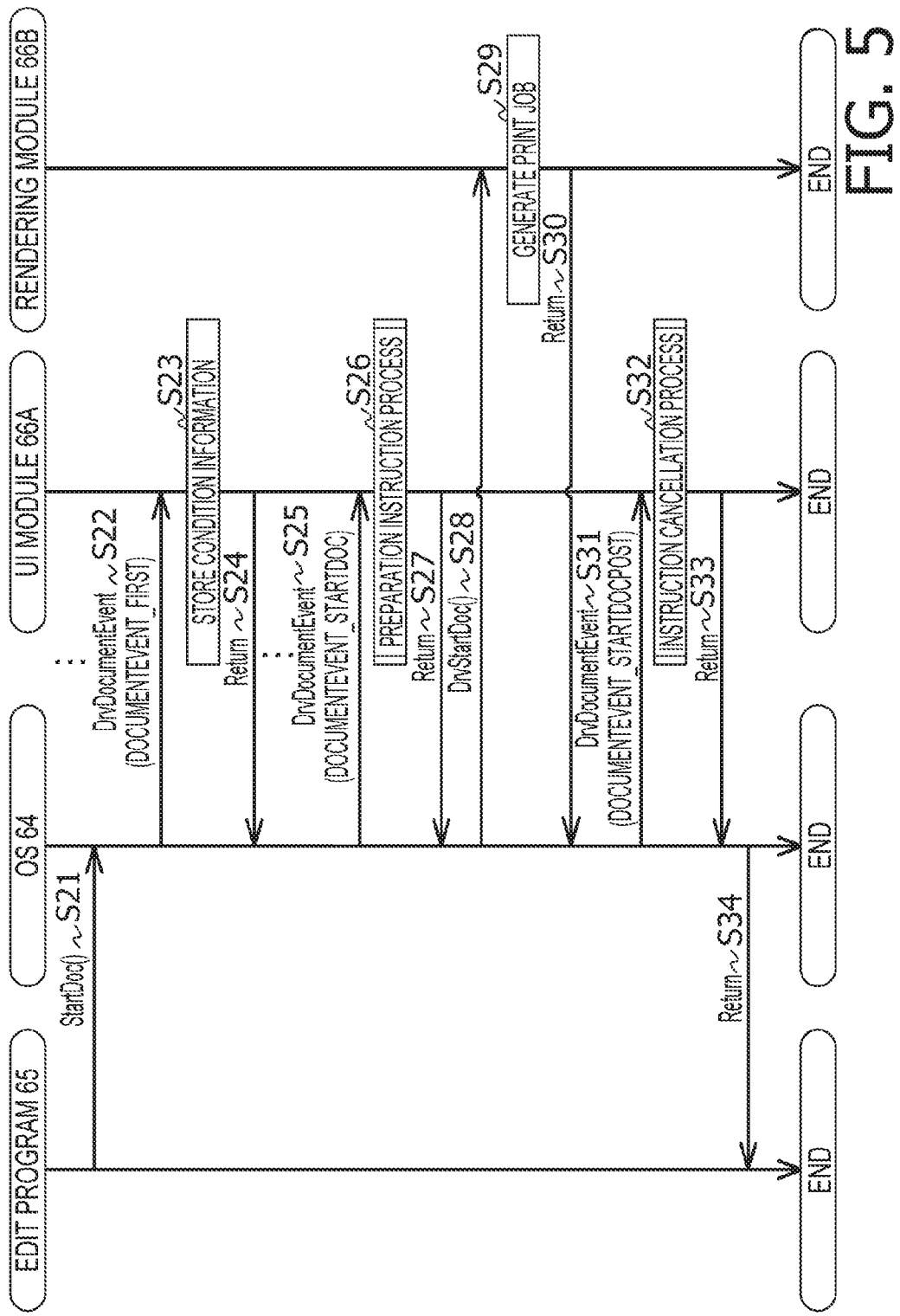
FIG. 5 is a flowchart showing a procedure of a StartDoc process to be executed by the information processing terminal in the illustrative embodiment according to one or more aspects of the present disclosure.
Figure 6:
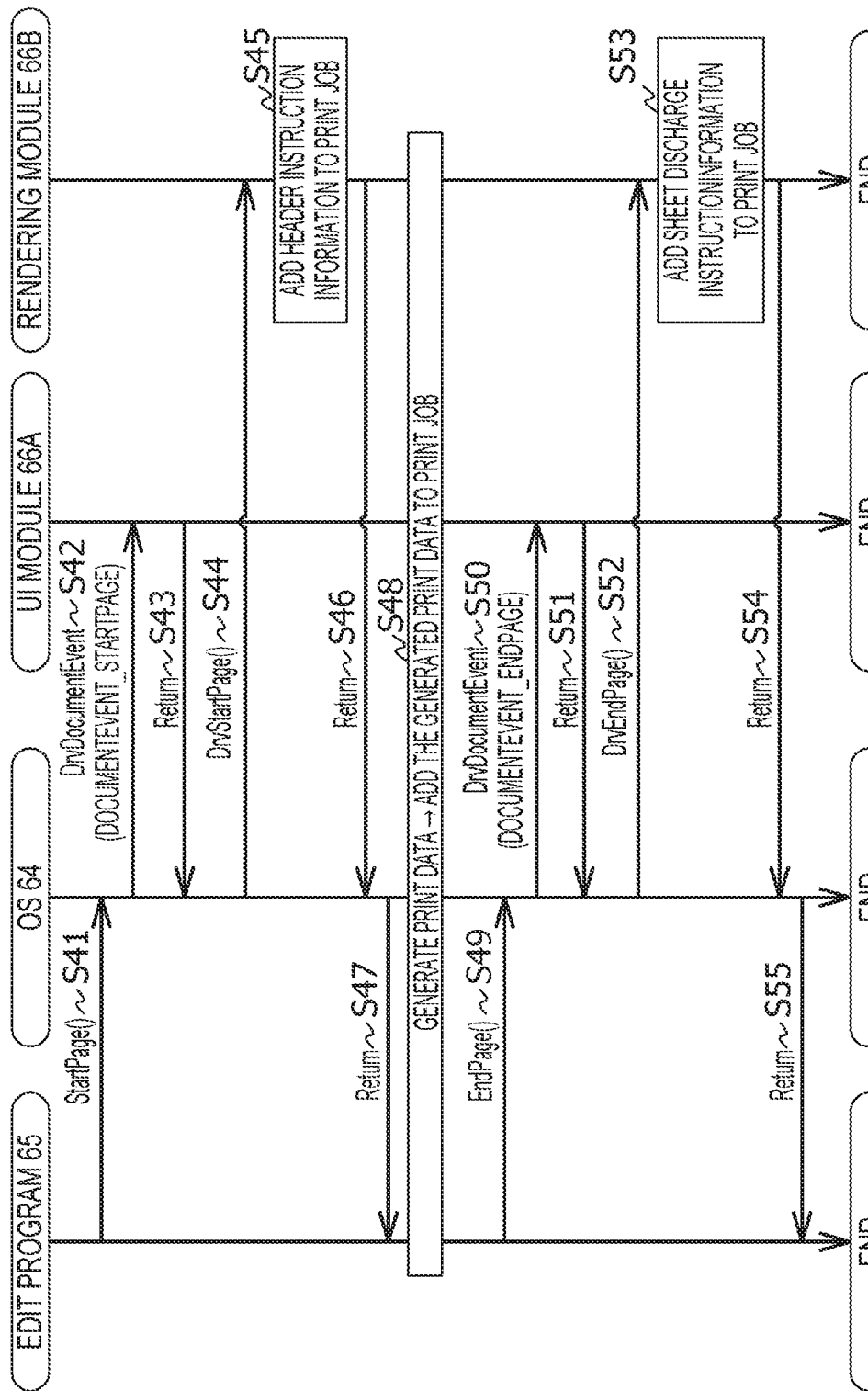
FIG. 6 is a flowchart showing a procedure of a StartPage process to be executed by the information processing terminal in the illustrative embodiment according to one or more aspects of the present disclosure.
Figure 7A:
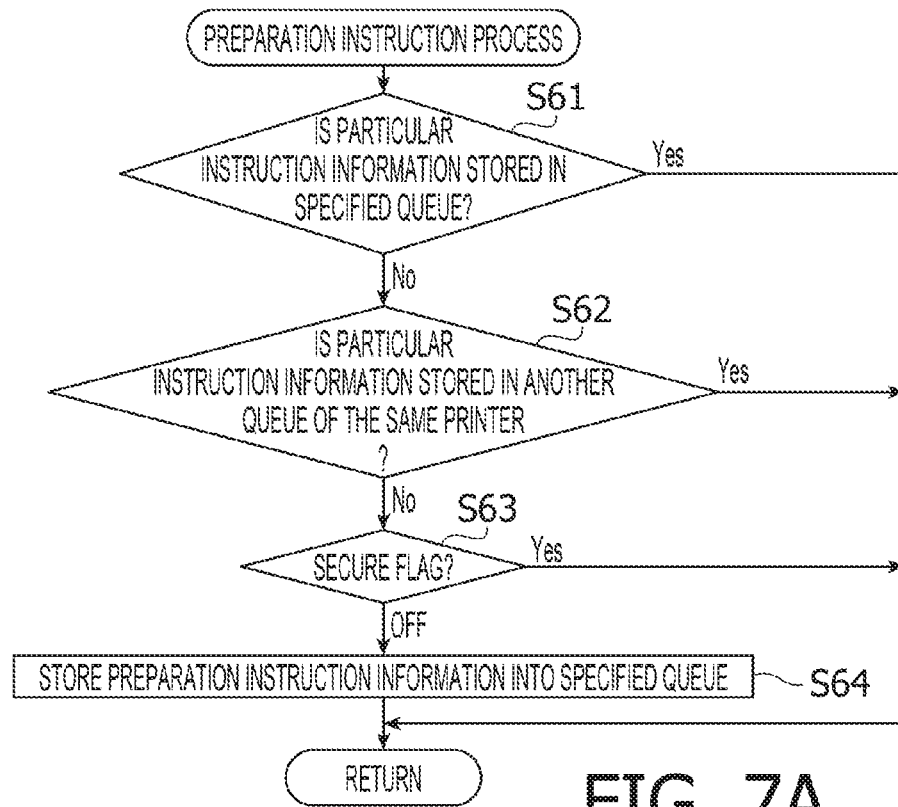
FIG. 7A is a flowchart showing a procedure of a preparation instruction process to be executed by the information processing terminal in the illustrative embodiment according to one or more aspects of the present disclosure.
Figure 7B:
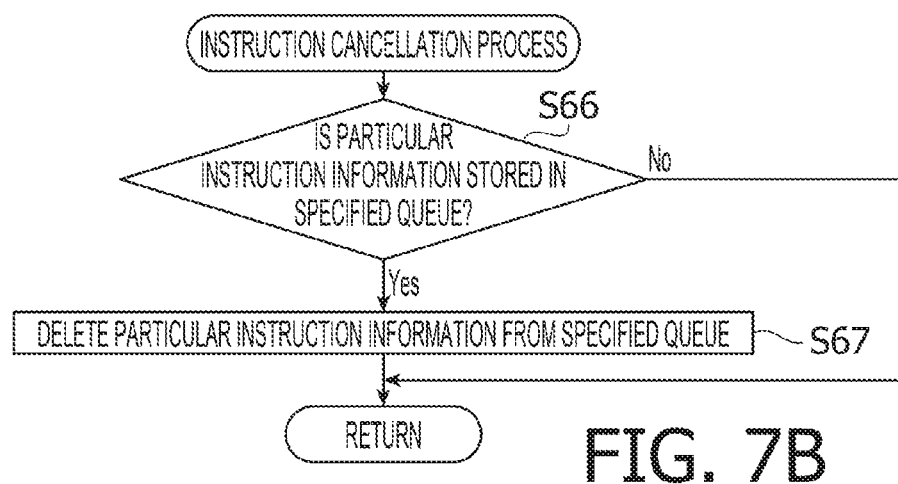
FIG. 7B is a flowchart showing a procedure of an instruction cancellation process to be executed by the information processing terminal in the illustrative embodiment according to one or more aspects of the present disclosure.

The driver program 66 is for causing the printer 10 to perform a printing operation in accordance with a print instruction received from the OS 64. In the illustrative embodiment, as shown in FIGS. 5 and 6, the driver program 66 includes a UI module 66A and a rendering module 66B. The UI module 66A may be an example of a first module according to aspects of the present disclosure. The rendering module 66B may be an example of a second module according to aspects of the present disclosure. Nonetheless, the driver program 66 may include only a single module or may further include another module. The driver program 66 may be configured to provide an instruction to perform a printing operation only to the printer 10 of a single model or to the printers 10 of a plurality of models.

In the driver program 66, a plurality of functions specified by the OS 64 are defined. The driver program 66 is configured to cause the printer 10 to perform a printing operation in response to the plurality of functions being invoked in a particular order by the OS 64. In the illustrative embodiment, for instance, the print instruction represents that a first function "DrvDocumentEvent( )" defined by the UI module 66A is invoked by the OS 64 with a constant "DOCUMENT-EVENT_STARTDOC" as an argument.

As shown in FIG. 2A, the data storage area 62B includes a first area 62C and a second area 62D. For instance, the first area 62C is a so-called registry as a database containing basic information regarding the OS 64 and/or setting information for the driver program 66. A reference procedure for referring to information stored in the first area 62C is defined by the OS 64. The OS 64 guarantees the correctness of information referred to in accordance with the reference procedure, but does not guarantee the correctness of information referred to without following the reference procedure. In contrast, the information stored in the second area 62D may be referred to at arbitrary timing with no need to follow any reference procedure. In the following description, when an expression such as "a program stores information into the area 62B" is used, it generally represents that the information is stored into the second area 62D. An example of the reference procedure for referring to the information stored in the first area 62C will be described below.

For example, the edit program 65 secures a particular memory area in the second area 62D. Then, the edit program 65 invokes a read function defined by the OS 64 with a first pointer "DEVMODE" as an argument. The first pointer "DEVMODE" indicates a head address of the secured memory area. The OS 64 makes a copy of information stored in the first area 62C and stores the copy of the information into the memory area indicated by the first pointer "DEVMODE." Thereby, the edit program 65 is allowed to read or edit the information copied from the first area 62C into the memory area indicated by the first pointer "DEVMODE."

As another example, in the driver program 66, a function (e.g., the first function "DrvDocumentEvent( )") prescribed by the OS 64 is defined. The OS 64 invokes the first function with a constant "DOCUMRNTEVENT_FIRST" and a second pointer as arguments. The second pointer indicates a head address of a memory area where the information stored in the first area 62C is stored or a head address of a memory area where information copied from the first area 62C into the second area 62D is stored. The driver program 66 is allowed to read or edit the information stored in the memory area indicated by the second pointer, as information stored in the first area 62C. In the illustrative embodiment, an instruction to execute the first function with the constant "DOCUMENTEVENT_FIRST" and the second pointer specified as arguments may be referred to as a "reference instruction" to permit reference of the information stored in the first area 62C.

For instance, as shown in FIG. 2B, the first area 62C stores therein condition information. The condition information indicates execution conditions for the printer 10 to execute a printing operation. In the illustrative embodiment, the condition information includes size information, color information, tray information, sheet information, margin information, a secure flag, and authentication information. Nonetheless, specific examples of the condition information are not limited to the examples shown in FIG. 2B.

The condition information is stored into the first area 62C at a timing when the driver program 66 is installed. Further, the driver program 66 is enabled to change the condition information stored in the first area 62C in accordance with a user instruction. More specifically, the driver program 66 reads the condition information out of the first area 62C in accordance with the reference instruction from the OS 64, and displays the read condition information on the display 53. Subsequently, in response to acceptance of a user operation to change the condition information via the input I/F 54, the driver program 66 overwrites the condition information stored in the first area 62C with the changed one.

The condition information contains public information and private information. The public information is editable by the driver program 66 and other programs (e.g., the edit program 65) installed in the information processing terminal 50. The private information is not allowed to be edited by any other programs but the driver program 66 installed in the information processing terminal 50. In other words, the private information is editable only by the driver program 66. As exemplified in FIG. 2B, the size information and the color information are included in the public information. The tray information, the sheet information, the margin information, the secure flag, and the authentication information are included in the private information.

The size information indicates the size (e.g., "A4" or "B5") of a sheet to be used for the printing operation. The color information indicates the number of inks (e.g., "color" or "monochrome") to be used for the printing operation. The tray information indicates a particular one (e.g., "tray 1" or "tray 2") of the plurality of feed trays of the printer 10. The sheet information indicates a type (e.g., "plain paper" or "glossy paper") of the sheet to be used for the printing operation. The margin information indicates whether to form a particular width of margin at outer edge portions of the sheet in the printing operation (e.g., "margined printing" or "margin-less printing").

The secure flag indicates whether to cause the printer 10 to perform so-called secure printing. For the secure flag, a first value "ON" or a second value "OFF" is set. The first value "ON" corresponds to an instruction to execute the secure printing. The second value "OFF" corresponds to an instruction not to execute the secure printing. The authentication information is a PIN ("PIN" is an abbreviated form of Personal Identification Number) specified by the user. A valid value is set for the authentication information only when the first value "ON" is set for the secure flag.

The secure printing is a printing operation to be started in response to valid authentication information being input as a trigger. Namely, the printer 10 does not start the printing operation immediately upon receipt of print instruction information for instructing the printer to execute the secure printing, but starts the printing operation in response to acceptance of an input of the authentication information via the input I/F 24. The secure flag and the authentication information may be examples of trigger information according to aspects of the present disclosure. The trigger information represents a trigger for causing the printer 10 to start the printing operation after receiving the print instruction information.

A data structure of the public information is defined by the OS 61. Only exemplary items of the public information are shown in FIG. 2B. On the other hand, a data structure of the private information may be different between the plurality of printers 10 or between a plurality of driver programs 66. Hereinafter, an execution condition represented by the public information may be referred to as a "public condition,"

and an execution condition represented by the private information may be referred to as a "private condition."

The data storage area 62B may include one or more queue areas. In the illustrative embodiment, as shown in FIG. 3A, the data storage area 62B includes a plurality of queue areas 67A, 67B, and 67C. The queue areas 67A to 67C are memory areas where information to be transmitted to the printers 10A and 10B is stored. Each of the queue areas 67A to 67C is associated with a printer port specifically for one of the printers 10A and 10B. In the illustrative embodiment, information to be transmitted to the printer 10A is stored in the queue areas 67A and 67B. In addition, information to be transmitted to the printer 10B is stored in the queue area 67C. Further, for instance, the OS 64 specifies, for the driver program 66, one of the queue areas 67A to 67C to store information as an argument of a function. Hereinafter, a queue area of the queue areas 67A to 67C that is specified for the driver program 66 may be referred to as a "specified queue."

In the queue areas 67A to 67C, information for instructing the printers 10A and 10B to execute various kinds of operations is stored. More specifically, in the queue areas 67A to 67C, print instruction information shown in FIG. 3B, preparation instruction information shown in FIG. 3C, and status transmission instruction information (not shown) are stored. The print instruction information is for instructing the printers 10A and 10B to execute a printing operation. The print instruction information includes feeding instruction information, cueing instruction information, conveyance instruction information, ink discharge instruction information, and sheet discharge instruction information. The preparation instruction information is for instructing the printers 10A and 10B to execute the pre-printing operations. The status transmission instruction information (not shown) is for instructing the printers 10A and 10B to transmit status information showing statuses of the printers 10A and 10B. Nonetheless, specific examples of the information stored in the queue areas 67A to 67C are not limited to the aforementioned kinds of information.

The queue area 67A is an area in which one or more pieces of information to be transmitted by the OS 64 to the printer 10A via the communication I/F 55 are storable with a transmission sequence specified therefor. In other words, the OS 64 checks at particular timing whether instruction information is stored in the queue area 67A. In response to determining that instruction information is stored in the queue area 67A, the OS 64 transmits the instruction information to a printer 10 via the communication I/F 55 in a previously-specified transmission sequence, and deletes the transmitted instruction information from the queue area 67A. The same applies to the queue areas 67B and 67C.

More specifically, as shown in FIGS. 3B and 3C, each piece of the instruction information stored in the queue area 67A has a corresponding job ID added thereto. Each job ID is information for identifying instruction information to be sequentially transmitted, from among the instruction information stored in the queue area 67A. Namely, there may be a case where the same job ID is added to a plurality of pieces of instruction information. The OS 64 transmits the plurality of pieces of instruction information with the same job ID added thereto, in the sequence in which the plurality of pieces of instruction information are stored in the queue area 67A. Further, the OS 64 transmits a plurality of pieces of instruction information with different job IDs added thereto, in a sequence in which the job IDs have been generated.

For instance, in the queue area 67A shown in FIG. 3B, the OS 64 first transmits the conveyance instruction information, the ink discharge instruction information, and the sheet discharge instruction information, which have a job ID "contents data A" added thereto, in the aforementioned sequence. Subsequently, the OS 64 transmits the feeding instruction information and the cueing instruction information, which have a job ID "contents data B" added thereto, in this sequence. In this case, even though the feeding instruction information with the job ID "contents data B" added has been written into the queue area 67A earlier than the sheet discharge instruction information with the job ID "contents data A" added, the sheet discharge instruction information is transmitted earlier than the feeding instruction information. Namely, a plurality of pieces of instruction information with the same job ID added are sequentially transmitted in a sequence in which the plurality of pieces of instruction information have been written.

[Operations of System]

Referring to FIGS. 4 to 8, operations of the printing system 1 of the illustrative embodiment will be described.

In the present disclosure, basically, flowcharts show processes to be executed by the CPU 31 or the CPU 61 in accordance with instructions described in programs. Namely, in the following description, processes such as "determining," "extracting," "selecting," and "controlling" represent processes by the CPU 31 or the CPU 61. Processes by the CPU 61 may include hardware control via the OS 64. Further, in the present disclosure, "data" may be expressed by computer-readable bit string. Furthermore, a plurality of pieces of data that have substantially the same contents but have respective different formats may be treated as the same data. The same applies to "information" in the present disclosure.

FIGS. 4 to 8 (especially, FIGS. 5 and 6) show processes that are particularly important in the present disclosure, whereas other processes to be executed between the particularly important processes are omitted. More specifically, the OS 64 may invoke unshown functions other than the functions shown in FIGS. 5 and 6. Further, in the following description, only typical arguments will be described among arguments that may be specified when each function is invoked, but other arguments may be specified. Further, in the following description, among processes defined by each invoked function, particularly important processes will be described, whereas the other processes may not be described.

Firstly, the edit program 65 of the information processing terminal 50 causes the display 53 to display an edit screen as shown in FIG. 9A. The edit screen includes a read instruction icon 111, a storage instruction icon 112, a print instruction icon 113, and an edited image 114. The edit program 65 accepts a user operation to the edit screen, via the input I/F 54.

The read instruction icon 111 corresponds to an instruction to read contents data stored in the data storage area 62B. The storage instruction icon 112 corresponds to an instruction to store contents data showing the edited image 114 into the data storage area 62B. The print instruction icon 113 corresponds to an instruction to perform a printing operation based on the contents data. The edited image 114 is an image represented by page data included in the contents data. The edit program 65 of the illustrative embodiment displays the edited image 114 on the edit screen in such a manner that a longitudinal direction of the edited image 114 is along a vertical direction of the display 53.

In response to acceptance of a user operation to specify the read instruction icon 111 via the input I/F 54, the edit program 65 causes the display 53 to display a list of readable-format contents data. Next, the edit program 65 reads, out of the data storage area 62B, contents data specified via the input I/F 54. Then, the edit program 65 causes the display 53 to display the edited image 114 represented by the read contents data. In response to acceptance of a user operation to provide an instruction to edit the edited image 114 via the input I/F 54, the edit program 65 edits the contents data. In response to acceptance of a user operation to specify the storage instruction icon 112 via the input I/F 54, the edit program 65 stores the edited contents data into the data storage area 62B.

In response to acceptance of a user operation to specify the print instruction icon 113 via the input I/F 54, the edit program 65 temporarily stores a data ID, which identifies the contents data being edited, into the data storage area 62B. Hereinafter, the temporarily-stored data ID may be referred to as a "specified data ID." The contents data identified by the specified data ID may be referred to as "specified contents data." In the illustrative embodiment, a specified data ID "contents data C" is temporarily stored. Then, the edit program 65 performs a print instruction process. The print instruction process is for instructing the printer 10 to perform a printing operation based on the specified contents data. The print instruction process will be described with reference to FIG. 4.

[Print Instruction Process]

Firstly, the edit program 65 secures a memory area for storing the condition information, in the second area 62D of the data storage area 62B. Further, the edit program 65 invokes the read function defined by the OS 64 with the first pointer "DEVMODE" specified as an argument. The first pointer indicates a head address of the secured memory area. Thereby, the condition information stored in the first area 62C is copied by the OS 64 into the memory area indicated by the first pointer "DEVMODE." Hereinafter, the condition information stored in the memory area secured in the second area 62D may be referred to as "edited condition information."

Subsequently, the edit program 65 causes the display 53 to display a standard setting screen as shown in FIG. 10 (S11). The standard setting screen includes a pulldown menu 121, radio buttons 122, 123, 124, and 125, an "OK" icon 126, and a "CANCEL" icon 127. Then, the edit program 65 accepts a user operation to the standard setting screen, via the input I/F 54 (S12).

The pulldown menu 121 corresponds to an instruction to specify a printer 10 that is caused to perform a printing operation. The radio buttons 122 and 123 correspond to setting values "A4" and "B5" that are settable for the size information. The radio buttons 124 and 125 correspond to setting values "color" and "monochrome" that are settable for the color information. In the standard setting screen as first displayed, the states of the radio buttons 122 to 125 correspond to setting values set for the edited condition information. The "OK" icon 126 corresponds to an instruction to cause the printer 10 to perform the printing operation based on the specified contents data in accordance with execution conditions indicated by the edited condition information. The "CANCEL" icon 127 corresponds to an instruction to terminate the print instruction process.

In response to acceptance of a user operation to the pulldown menu 121 via the input I/F 54, the edit program 65 temporarily stores a printer ID (hereinafter referred to as a "specified printer ID") identifying the specified printer 10 into the data storage area 62B. In the illustrative embodiment, the printer 10A identified by a printer ID "MFP-A" is specified. Further, in response to acceptance of a user operation to the radio buttons 122 to 125 via the input I/F 54 (S12: Setting Change), the edit program 65 updates the edited condition information with a setting value corresponding to a specified one of the radio buttons 122 to 125 (S13).

Then, the edit program 65 causes the display 53 to display the standard setting screen in which the user operations have been reflected (S11). Namely, the edit program 65 is allowed to accept, via the standard setting screen, designation of the printer 10 that is caused to perform the printing operation and changes of the public information included in the edited condition information. Meanwhile, the edit program 65 is unable to accept any change of the private information included in the edited condition information.

In response to accepting designation of the "OK" icon 126 via the input I/F 54 (S12: "OK" Icon), the edit program 65 performs a StartDoc process (S14). Meanwhile, although the following operation is not shown in FIG. 4, the edit program 65 terminates the print instruction process in response to accepting designation of the "CANCEL" icon 127 via the input I/F 54. The StartDoc process is preprocessing for causing the printer 10 to perform the printing operation. The StartDoc process will be described below with reference to FIG. 5.

[StartDoc Process]

Firstly, the edit program 65 invokes a function "StartDoc( )" defined by the OS 64 (S21). Hereinafter, a function invoked in a step Sxx may be referred to as a "function Sxx." For example, the function "StartDoc( )" invoked in S21 may be referred to as a "function S21." The edit program 65 specifies, as arguments of the function S21, the specified data ID "contents data C," the specified printer ID "MFP-A," and the first pointer. In response to the function S21 being invoked, the OS 64 invokes various functions defined by the driver program 66 in a particular order. Further, the driver program 66 performs processes defined by the functions invoked by the OS 64. Detailed explanations of the processes will be omitted.

The OS 64, from which the function S21 has been invoked by the edit program 65, invokes the first function "DrvDocumentEvent( )" (S22). The OS 64 specifies the constant "DOCUMENTEVENT_FIRST" and the second pointer as arguments of the function S22. The second pointer indicates the head address of the first area 62C where the condition information is stored or the head address of the memory area where the condition information read out by the OS 64 from the first area 62C is stored.

Subsequently, in response to the function S22 being invoked, the UI module 66A reads out the condition information stored in the memory area indicated by the second pointer, and stores the read condition information into the second area 62D (S23), and then terminates the function S22 (S24). Namely, in S23, the UI module 66A stores the condition information read out from the first area 62C into the second area 62D. The process in S22 executed by the driver program 66 may be an example of a reference accepting process according to aspects of the present disclosure. The process in S23 executed by the driver program 66 may be an example of a storing process according to aspects of the present disclosure.

Hereinafter, the condition information stored into the second area 62D in S23 may be referred to as "retracted condition information." The edited condition information and the retracted condition information may have the same private information but may have different public information. More specifically, when the edited condition information is updated in S13, the public information is different between the edited condition information and the retracted condition information.

Further, the OS 64, from which the function S21 has been invoked, invokes the first function "DrvDocumentEvent( )" (S25). The OS 64 specifies the constant "DOCUMENT-EVENT_STARTDOC" as an argument of the function S25. The process in S25 is performed later than the process in S22. Next, the UI module 66A, from which the function S25 has been invoked, performs a preparation instruction process (S26). The preparation instruction process is a process to instruct the printer 10 to perform the pre-printing operation. The process in S25 executed by the UI module 66A may be an example of a print instruction accepting process according to aspects of the present disclosure. The preparation instruction process will be described with reference to FIG. 7A.

An instruction to cause the printer 10 to perform a pre-printing operation is preferred to be provided when the print instruction information is certain to be transmitted to the printer 10. After the "OK" icon 126 is designated on the standard setting screen, the print instruction information is transmitted to the printer 10 without a user instruction being received via the input I/F 54. Namely, the designation of the "OK" icon 126 may be regarded as a user's intention to instruct the printer 10 to perform the printing operation. Thus, the UI module 66A is preferred to perform the preparation instruction process after the "OK" icon 126 is designated on the standard setting screen.

More specifically, in response to the "OK" icon 126 on the standard setting screen being designated via the input I/F 54 (S12: "OK" Icon), the edit program 65 invokes the function S21. The OS 64 may invoke a function defined by the UI module 66A even at timing other than a moment at which the function S21 is invoked (e.g., even at timing to refer to information on a printer driver). However, the OS 64 invokes the function S25 only when the function S21 is invoked. Thus, in the illustrative embodiment, the UI module 66A performs the preparation instruction process in response to the function S21 being invoked.

[Preparation Instruction Process]

Firstly, the UI module 66A determines whether particular instruction information is stored in the queue area 67A that is a specified queue for the printer 10A (S61). The specified queue is designated as an argument of a function invoked by the OS 64. Further, the UI module 66A determines whether particular instruction information is stored in the queue area 67B that is another queue area into which information to be sent to the printer 10A is stored (S62). It is noted that the UI module 66A also makes the determinations in S61 and S62 with respect to information written into the queue areas 67A and 67B by programs other than the driver program 66.

The particular instruction information represents an instruction to operate the operating unit 20 of the printer 10. In the illustrative embodiment, the particular instruction information includes the preparation instruction information or the print instruction information, but does not include the status transmission instruction information. Namely, the particular instruction information is written into the queue areas 67A to 67C when below-mentioned processes in S45, S48, S53, and S64 are executed by the driver program 66 or other programs.

Subsequently, in response to determining that particular instruction information is not stored in any of the queue areas 67A and 67B (S61: No, and S62: No), the UI module 66A reads out the retracted condition information stored in the second area 62D, and determines which value is set for the secure flag included in the retracted condition information (S63). In response to determining that the second value "OFF" is set for the secure flag (S63: OFF), the UI module 66A transmits the preparation instruction information to the printer 10A via the communication I/F 55 (S64).

More specifically, in S64, the UI nodule 66A generates a job ID "_preparation_." The job ID "_preparation_" may be an example of generation identification information according to aspects of the present disclosure. The UI module 66A generates the job ID so as to prevent the job ID from being identical to character strings that may become the specified data ID. This is because the specified data ID is used as a job ID in a below-mentioned step S29. Then, as shown in FIG. 3C, the UI module 66A stores, into the queue area 67A, the preparation instruction information to which the generated job ID "_preparation_" is added (S64). The preparation instruction information stored in the queue 67A is transmitted by the OS 64 to the printer 10A.

Meanwhile, in response to determining that particular instruction information is stored in the queue area 67A (S61: Yes), or determining that particular instruction information is stored in the queue area 67B (S61: No, and S62: Yes), or determining that the first value "ON" is set for the secure flag (S61: No, S62: No, and S63: ON), the UI module 66A terminates the preparation instruction process without executing S64. Namely, in the steps S61 to S63, the UI module 66A determines whether to provide the preparation instruction information to cause the printer 10A to start the pre-printing operations. In other words, the UI module 66A determines whether to transmit the preparation instruction information in advance of the below-mentioned print instruction information. The processes executed in S61 to S63 may be an example of a determining process or a first determining process according to aspects of the present disclosure.

Referring back to FIG. 5, the UI module 66A terminates the function S25 (S27). Next, in response to the function S25 being terminated (S27), the OS 64 invokes a second function "DrvStartDoc( )" defined by the rendering module 66B (S28). The OS 64 specifies the specified data ID "contents data C" specified as an argument of the function S21 and the first pointer, as arguments of the function S28.

Subsequently, in response to the function S28 being invoked, the rendering module 66B generates a print job with the specified data ID "contents data C," which has been specified as an argument of the function S28, as a job ID in the queue area 67A that is the specified queue (S29). Then, the rendering module 66B terminates the function S28 (S30). To various kinds of instruction information written into the queue 67A in below-mentioned steps S45, S48, and S53, the job ID "contents data C" is added. In this regard, however, the print job identified by the job ID "contents data C" does not include any instruction information at this point of time. The specified data ID, which is specified as an argument of the function S28, may be an example of specified identification information according to aspects of the present disclosure.

Subsequently, in response to the function S28 being terminated (S30), the OS 64 invokes the first function "DrvDocumentEvent( )" (S31). The OS 64 specifies the constant "DOCUMENTEVENT_STARTDOCPOST" as an argument of the function S31. Next, in response to the function S31 being invoked, the UI module 66A performs an instruction cancellation process (S32). The instruction cancellation process will be described below with reference to FIG. 7B.

The UI module 66A determines whether the preparation instruction information temporarily stored in S64 with the job ID "_preparation_" added thereto is stored in the queue area 67A (S66). Exemplary cases where a positive determination is made in S66 (S66: Yes) may include, but are not limited to, a case where the communication OF 55 is not connected with the communication network 100 and a case where the printer 10A is powered off.

In response to determining that the preparation instruction information is stored in the queue area 67A (S66: Yes), the UI module 66A deletes the preparation instruction information from the queue area 67A (S67). Meanwhile, in response to determining that the preparation instruction information is not stored in the queue area 67A (S66: No), the UI module 66A terminates the instruction cancellation process without executing S67. The process in S66 may be an example of a second determining process according to aspects of the present disclosure. The process in S67 may be an example of a deleting process according to aspects of the present disclosure.

Referring back to FIG. 5, the UI module 66A terminates the function S31 (S33). Further, in response to the function S31 being terminated, the OS 64 terminates the function S21 (S34). Thereby, the StartDoc process is terminated. Subsequent to the function S21, referring back to FIG. 4, the edit program 65 performs a StartPage process (S15). The StartPage process is a process of generating the print instruction information. The StartPage process is performed for each piece of page data contained in the specified contents data. For instance, each piece of page data as a processing target of the StartPage process is specified as an argument of a function, by the edit program 65. Referring to FIG. 6, the StartPage process will be described below.

[StartPage Process]

The edit program 65 invokes a function "StartPage" defined by the OS 64 (S41). Subsequently, the OS 64 invokes the first function "DrvDocumentEvent( )" (S42). The OS 64 specifies a constant "DOCUMENT-EVENT_STARTPAGE" as an argument of the function S42. Next, the UI module 66A performs a particular process and then terminates the function S42 (S43).

Subsequently, in response to the function S42 being terminated, the OS 64 invokes a function "DrvStartPage( )" defined by the rendering module 66B (S44). Next, in response to the function S44 being invoked, the rendering module 66B generates header instruction information and stores the generated header instruction information into the queue area 67A (S45). The header instruction information is print instruction information for indicating operations to be executed before recording an image on a single sheet, of a series of operations for recording the image on the single sheet. In the illustrative embodiment, the header instruction information includes the feeding instruction information and the cueing instruction information.

Then, the rendering module 66B terminates the function S44 (S46). Subsequently, in response to the function S44 being terminated (S46), the OS 64 terminates the function S41 (S47). Next, in response to the function S41 being terminated, the edit program 65 invokes a drawing function defined by the OS 64. Further, in response to the drawing function being invoked by the edit program 65, the OS 64 invokes a drawing function defined by the rendering module 66B.

Then, the plurality of drawing functions are performed in a particular order, and thereby the rendering module 66B generates print data from the page data. For instance, the print data may include, but is not limited to, raster data generated by rasterizing page data. Further, the rendering module 66B generates print instruction information that provides an instruction to perform a printing operation based on the print data, and stores the generated print instruction information into the queue area 67A (S48). As will be described later, in S48, the ink discharge instruction information and the feeding instruction information are generated. The process of generating the print data in S48 may be an example of a generating process according to aspects of the present disclosure. Hereinafter, a detailed explanation will be provided of a process of the rendering module 66B generating the print instruction information.

Firstly, at particular timing since S28, the rendering module 66B informs the OS 64 of unit information. The unit information represents a unit of data delivered as an object to be rasterized. For instance, "page" or "band" may be set for the unit information. The "page" provides an instruction to deliver the data to be rasterized on the basis of a unit of page data. The "band" provides an instruction to deliver the data to be rasterized on the basis of a unit of band data. A piece of band data is a part of a piece of page data. More specifically, a piece of page data is sectioned into a plurality of pieces of band data adjoining in a longitudinal direction of the corresponding page. Further, an image represented by a piece of band data has a larger area than an area of an image represented by a piece of below-mentioned pass data.

For instance, in response to a specific size (e.g., A4) being set for the size information of the edited condition information, the rendering module 66B informs the OS 64 of the unit information "page." A sheet of the specific size is conveyed by the sheet conveyor 21 of the printer 10, in a state where a short direction of the sheet is coincident with the conveyance direction. Further, on the sheet of the specific size, an image is recorded by the ink discharger 22 of the printer 10 moving along a longitudinal direction of the sheet.

Meanwhile, for instance, in response to a non-specific size (e.g., a size other than A4) being set for the size information of the edited condition information, the rendering module 66B informs of the unit information "band." A sheet of the non-specific size is conveyed by the sheet conveyor 21 of the printer 10, in a state where a longitudinal direction of the sheet is coincident with the conveyance direction. Further, on the sheet of the non-specific size, an image is recorded by the ink discharger 22 of the printer 10 moving along a short direction of the sheet.

It is noted that the unit information may be informed of, e.g., as a return value of a function invoked by the OS 64. Further, for instance, the specific size may be different between the printers 10A and 10B. The specific size for each of the printers 10A and 10B may be written in a source cord of the driver program 66. Alternatively, the driver program 66 may inquire of the printers 10A and 10B about the specific size(s) for the printers 10A and 10B.

The OS 64, which has acquired the unit information "page," delivers page data to the rendering module 66B in S48. The rendering module 66B rasterizes the whole of the page data received from the OS 64 and generates raster data. Subsequently, the rendering module 66B rotates the raster data developed into the data storage area 62B, by 90 degrees in the data storage area 62B. Next, the rendering module 66B extracts a plurality of pieces of pass data each representing an image to be recorded in one recording area, from the raster data rotated by 90 degrees. Then, the rendering module 66B generates ink discharge instruction information and conveyance instruction information based on each piece of the extracted pass data, and writes, in series into the queue area 67A, the generated ink discharge instruction information and the generated conveyance instruction information. The rendering module 66B sequentially performs, for every piece of the pass data included in the page data, extracting the pass data, generating the ink discharge instruction information and the conveyance instruction information, and writing the generated information into the queue area 67A.

Meanwhile, the OS 64, which has acquired the unit information "band," delivers one piece of the plurality of pieces of band data included in the page data to the rendering module 66B. The rendering module 66B rasterizes the whole of the band data received from the OS 64 and generates raster data. Subsequently, the rendering module 66B generates ink discharge instruction information and conveyance instruction information based on the raster data, and writes into the queue area 67A the generated ink discharge instruction information and the generated conveyance instruction information. Then, for every piece of the band data included in the page data, the aforementioned process is repeatedly performed.

Namely, in the case of the unit information "page," after the whole of the page data has been converted into the raster data, and the raster data has been rotated by 90 degrees in the data storage area 62B, the first piece of the ink discharge instruction information is written into the queue area 67A. Meanwhile, in the case of the unit information "band," after the whole of the band data that is a part of the page data has been converted into the raster data, the first piece of the ink discharge instruction information is written into the queue area 67A. That is, a period of time from when the "OK" icon 126 is specified to when the first ink discharge instruction information is written into the queue area 67A in the case of the unit information "page" is longer than that in the case of the unit information "band."

Subsequently, in response to the process in S48 for the specified page data being completed, the edit program 65 invokes a function "EndPage( )" defined by the OS 64 (S49). Next, the OS 64 invokes the first function "DrvDocumentEvent( )" (S50). The OS 64 specifies a constant "DOCUMENTEVENT_ENDPAGE" as an argument of the function S50. Next, the UI module 66A performs a particular process and terminates the function S50 (S51).

Subsequently, in response to the function S50 being terminated (S51), the OS 64 invokes a function "DrvEndPage( )" defined by the rendering module 66B (S52). Next, in response to the function S52 being invoked, the rendering module 66B generates sheet discharge instruction information, and stores the generated sheet discharge instruction information into the queue area 67A (S53).

A plurality of pieces of print instruction information written into the queue area 67A in the StartPage process shown in FIG. 6 are transmitted by the OS 64 to the printer 10A in the written sequence. Typically, the OS 64 transmits the feeding instruction information, the cueing instruction information, the ink discharge instruction information, the conveyance instruction information, the ink discharge instruction information, . . . , and the sheet discharge instruction information to the printer 10A in the above sequence via the communication OF 55. The process in S45, the process of storing the print instruction information into the queue area 67A in S48, and the process in S53 may be examples of a print instruction process according to aspects of the present disclosure.

Then, the rendering module 66 terminates the function S52 (S54). Subsequently, in response to the function S52 being terminated (S54), the OS 64 terminates the function S49 (S55). Thereby, the StartPage process is terminated. Next, referring back to FIG. 4, the edit program 65 determines whether the StartPage process has been performed for every piece of the page data included in the specified contents data (S16). In response to determining that there is an unprocessed piece of page data for which the StartPage process has not been performed (S16: Yes), the edit program 65 performs the StartPage process for the unprocessed piece of page data (S15).

Meanwhile, in response to determining that the StartPage process has been performed for every piece of the page data included in the specified contents data (S16: No), the edit program 65 performs an EndDoc process (S17). The EndDoc process is post-processing to be executed after causing the printer 10 to perform a printing operation. The EndDoc process is a known process to be started in response to a function "EndDoc( )" defined by the OS 64 being invoked by the edit program 65. Therefore, a detailed explanation of the EndDoc process will be omitted.

[Print Process]

Figure 8:
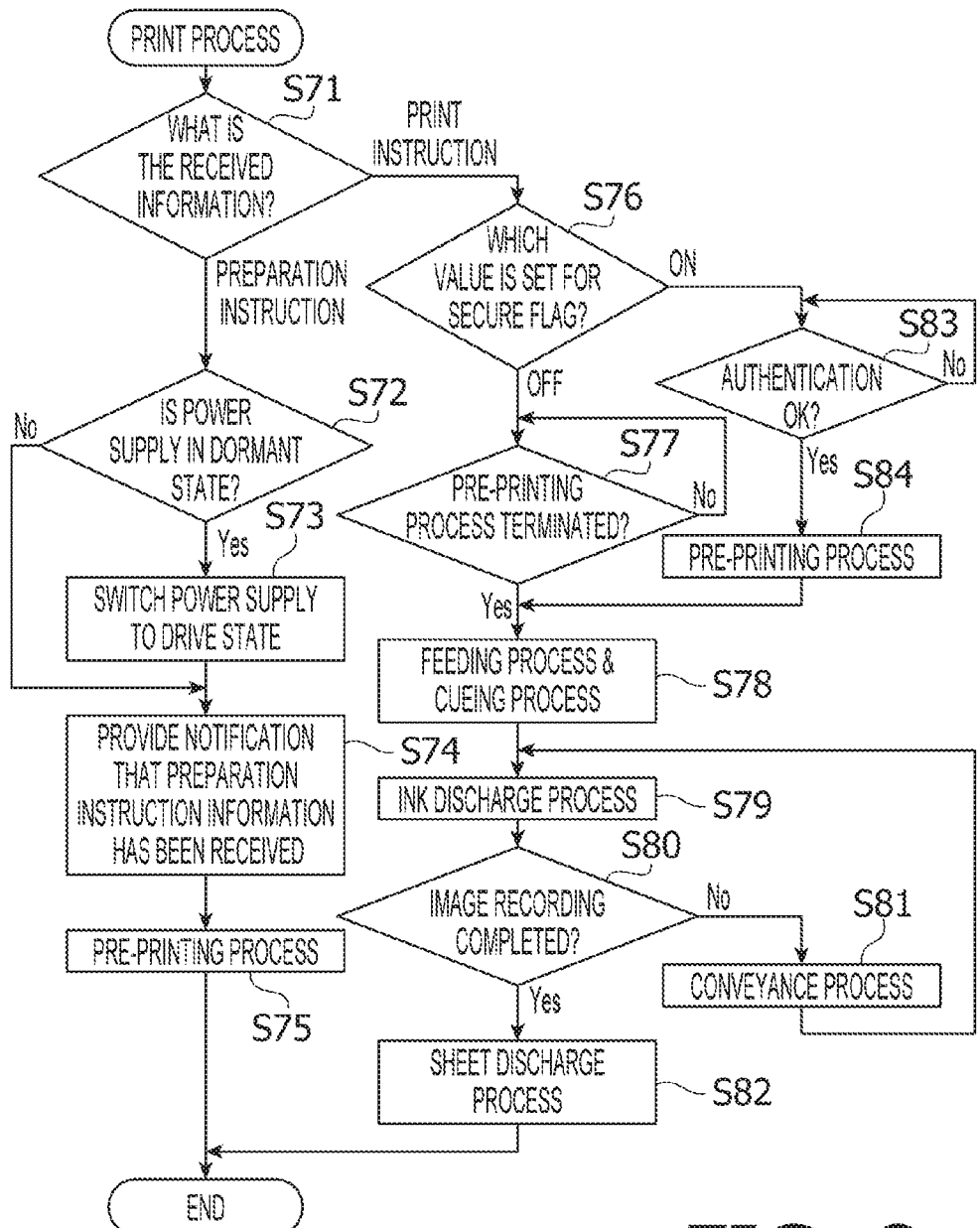
FIG. 8 is a flowchart showing a procedure of a print process to be executed by the printer in the illustrative embodiment according to one or more aspects of the present disclosure.

Subsequently, referring to FIG. 8, a print process to be performed by the printer 10 will be described. The printer 10 performs the print process in response to receiving the preparation instruction information or the print instruction information from the information processing terminal 50 via the communication I/F 25. Each of the following processes may be performed by the CPU 31 executing one or more programs 32A stored in the ROM 32 or may be performed by one or more hardware circuits included in the controller 30.

The controller 30 of the printer 10 receives the preparation instruction information from the information processing terminal 50 via the communication I/F 25 (S71: Preparation Instruction). The process of receiving the preparation instruction information in S71 may be an example of a preparation instruction receiving process according to aspects of the present disclosure. In response to receiving the preparation instruction information (S71: Preparation Instruction), the controller 30 determines whether the power supply 11 is in a dormant state (S72). For example, the controller 30 may store flag information indicating a current state of the power supply 11 in the RAM 33 or the EEPROM 34, and may make the determination in S72 based on the flag information. Nonetheless, the method for making the determination in S72 is not limited to the above example. The controller 30 may make the determination in S72 in other methods.

Subsequently, in response to determining that the power supply 11 is in the dormant state (S72: Yes), the controller 30 switches the state of the power supply 11 from the dormant state to a drive state (S73). More specifically, the controller 30 outputs a power supply signal of a HIGH level to the power supply 11. Meanwhile, in response to determining that the power supply 11 is in the drive state (S72: No), the controller 30 skips S73. The process in S72 may be an example of a state determining process according to aspects of the present disclosure. The process in S73 may be an example of a switching process according to aspects of the present disclosure.

Subsequently, the controller 30 provides a notification that the preparation instruction information has been received, via the display 23 (S74). For example, the controller 30 may provide the notification by lighting a backlight of the display 23 only for a particular period of time. The process in S74 may be an example of a notification process according to aspects of the present disclosure. The display 23 may be an example of a notification provider according to aspects of the present disclosure. Nonetheless, the method for providing the notification is not limited to the above example. The controller 30 may provide the notification in other methods, e.g., by lighting an LED lamp (not shown) or by outputting a sound from a speaker (not shown).

Subsequently, the controller 30 controls the operating unit 20 to perform a pre-printing process (S75). The pre-printing process is a process to be performed by the printer 10 in advance of the printing operation so as to record an image with particular quality on a sheet in the printing operation. The pre-printing process includes a plurality of pre-printing operations. For instance, the pre-printing process may include some or all of an uncapping process, a flushing process, and a voltage boosting process. The uncapping process is a process of separating a cap for covering the nozzle surface away from the ink discharger 22. The flushing process is a process of causing the ink discharger 22 to discharge ink droplets outside an area through which sheets pass. The voltage boosting process is a process of boosting a supply voltage of the power supply 11 to a target voltage.

The controller 30 stores flag information corresponding to each of the plurality of pre-printing operations in the RAM 33 or the EEPROM 34. At a point of time to start the pre-printing operation, a second value "OFF" representing that the corresponding pre-printing operation has not been completed is set for every piece of the flag information. Then, in response to one of the pre-printing operations being completed, the controller 30 sets, for the corresponding piece of the flag information, a first value "ON" representing that the pre-printing operation has been completed.

Subsequently, the controller 30 receives the print instruction information from the information processing terminal 50 via the communication I/F 25 (S71: Print Instruction). Namely, the controller 30 receives the feeding instruction information, the cueing instruction information, the ink discharge instruction information, the conveyance instruction information, the ink discharge instruction information, . . . , and the sheet discharge instruction information in this sequence from the information processing terminal 50 via the communication I/F 25. The process of receiving the print instruction information in S71 may be an example of a print instruction receiving process according to aspects of the present disclosure.

The feeding instruction information is for instructing the sheet conveyor 21 to feed a sheet from a feed tray identified by the tray information of the edited condition information. The cueing instruction information is for instructing the sheet conveyor 21 to convey the fed sheet to a position where a first recording area of the sheet is opposed to the ink discharger 22. The ink discharge instruction information indicates ink discharge timing for the ink discharger 22 to discharge ink droplets to record an image on the recording area of the sheet opposed to the ink discharger 22. The conveyance instruction information is for instructing the sheet conveyor 21 to convey the sheet to a position where a next recording area for an image to be subsequently recorded is opposed to the ink discharger 22. The sheet discharge instruction information is for instructing the sheet conveyor 21 to discharge the sheet with images recorded thereon.

Subsequently, the controller 30 determines which setting value is set for the secure flag included in the print instruction information (S76). Next, in response to determining that the second value "OFF" is set for the secure flag (S76: OFF), the controller 30 determines whether the pre-printing process has been terminated (S77). More specifically, in response to the first value "ON" being set for every piece of the flag information associated with the pre-printing process, the controller 30 determines that the pre-printing process has been terminated (S77: Yes). Meanwhile, in response to the second value "OFF" being set for at least one piece of the flag information associated with the pre-printing process, the controller 30 determines that the pre-printing process has not been terminated (S77: No).

A receipt time interval between the preparation instruction information and the print instruction information varies, e.g., depending on a throughput in S48 or a condition of the communication network 100. Namely, the pre-printing process started in response to receipt of the preparation instruction information as a trigger may not have been terminated at a point of time when the print instruction information is received. Thus, in response to determining that the pre-printing process has not been terminated (S77: No), the controller 30 waits in a standby state until the pre-printing process is terminated, without executing the subsequent process. Then, in response to determining that the pre-printing process has been terminated (S77: Yes), the controller 30 controls the operating unit 20 to perform a printing operation according to the received print instruction information (S78-S82). The processes executed in S78 to S82 may be an example of a print process according to aspects of the present disclosure.

In the printing operation, firstly, the controller 30 performs a feeding process according to the received feeding instruction information and a cueing process according to the received cueing instruction information (S78). Namely, the controller 30 controls the sheet conveyor 21 to feed a sheet placed on a feed tray identified by the feeding instruction information. Next, the controller 30 controls the sheet conveyor 21 to convey the sheet fed in the feeding process to a position indicated by the cueing instruction information. It is noted that the feeding process and the cueing process may be performed in the pre-printing process.

Subsequently, the controller 30 performs an ink discharge process in accordance with the received ink discharge instruction information (S79). Namely, the controller 30 moves the ink discharger 22 from one side to the other side in the main scanning direction, and controls the ink discharger 22 to discharge ink droplets at ink discharge timing indicated by the ink discharge instruction information. Next, the controller 30 determines whether an image has been recorded in every recording area of the sheet (S80). In other words, the controller 30 determines which one of the conveyance instruction information and the sheet discharge instruction information has been received next to the ink discharge instruction information used in the last step S79.

Subsequently, in response to determining that an image has not been recorded in every recording area of the sheet (S80: No), the controller 30 performs a conveyance process according to the received conveyance instruction information (S81). Namely, the controller 30 controls the sheet conveyor 21 to convey the sheet only over a conveyance distance indicated by the conveyance instruction information. The controller 30 repeatedly performs the steps S79 to S81 until an image has been recorded in every recording area of the sheet (S80: No).

Then, in response to determining that an image has been recorded in every recording area of the sheet (S80: Yes), the controller 30 performs a sheet discharge process according to the received sheet discharge instruction information (S82). Namely, the controller 30 controls the sheet conveyor 21 to discharge the sheet with the images recorded thereon out of the printer 10. It is noted that, when the specified contents data includes a plurality of pieces of page data, the controller 30 repeatedly performs the steps S78 to S82. Thereby, the images represented by the print data generated in S48 (i.e., the images represented by the specified contents data) are recorded on the sheets.

Meanwhile, in response to determining that the first value "ON" is set for the secure flag (S76: ON), the controller 30 accepts an input of authentication information via the input I/F 24. Then, the controller 30 determines whether the authentication information input via the input I/F 24 is identical to authentication information included in the print instruction information (S83). Subsequently, in response to determining that the authentication information input via the input I/F 24 is identical to the authentication information included in the print instruction information (S83: Yes), the controller 30 performs the pre-printing process (S84). Then, in response to the pre-printing process being terminated, the controller 30 performs S78 and the following steps. Meanwhile, in response to determining that the authentication information input via the input I/F 24 is not identical to the authentication information included in the print instruction information (S83: No), the controller 30 prompts the user to again input authentication information via the input I/F 24.

[Operations and Advantageous Effects of Illustrative Embodiment]

According to the illustrative embodiment, it is determined whether to transmit the preparation instruction information, at the timing when the function S25 is invoked. Therefore, it is possible to prevent the printer 10 from performing unnecessary pre-printing operations. In other words, it is possible to instruct the printer 10 to perform the pre-printing operations, at appropriate timing. Further, while the printer 10 is performing the pre-printing operations in accordance with the preparation instruction information, the information processing terminal 50 generates the print data. Therefore, it is possible to shorten an FPOT ("FPOT" is an abbreviated form of "First Print Output Time") that is a period of time taken from when the "OK" icon 126 is specified on the standard setting screen to when the first sheet is discharged from the printer 10.

When the first value "ON" is set for the secure flag, the printer 10 does not start the printing operation immediately upon receipt of the print instruction information, but starts the printing operation in response to acceptance of the authentication information input via the input I/F 24 as a trigger. In such a case, as exemplified in the illustrative embodiment, by skipping the preparation instruction process, it is possible to prevent the printer 10 from performing unnecessary pre-printing operations. It is noted that "the trigger to start the printing operation" is not limited to the input of the authentication information, but may include, e.g., coming of preset date and time.

Further, as exemplified in the illustrative embodiment, by retracting the condition information stored in the first area 62C into the second area 62D, it is possible to determine at appropriate timing whether there is a need to transmit the preparation instruction information. Further, the secure flag, which is included in the private information, is not editable by any other programs installed in the information processing terminal 50 but the driver program 66. Therefore, it is possible to determine at appropriate timing whether there is a need to transmit the preparation instruction information, based on the retracted condition information.

Further, when particular instruction information is already stored in a queue area, the operating unit 20 of the printer 10 operates in accordance with the particular instruction information. In such a case, as exemplified in the illustrative embodiment, by skipping the preparation instruction process, it is possible to prevent the printer 10 from performing unnecessary pre-printing operations. Further, by checking not only the specified queue but all queue areas into which instruction information to be transmitted to the printer 10 is written, it is possible to further effectively prevent the printer 10 from performing unnecessary pre-printing operations.

In the meantime, when a transmission time interval between the preparation instruction information and the print instruction information is short, it is less advantageous to start the pre-printing operations according to the preparation instruction information in advance of the printing operation. In view of such a situation, as exemplified in the illustrative embodiment, when the preparation instruction information still remains in the queue area although the print job has been generated, by deleting the preparation instruction information from the queue area, it is possible to reduce a communication traffic between the printer 10 and the information processing terminal 50.

Further, when the printer 10 is caused to record an image on a sheet of a specific size, print data is generated after a longitudinal direction and a short direction of specified contents data are inverted. Therefore, it takes a longer period of time to perform a generation process of generating the print data than when the printer 10 is caused to record an image on a sheet of a non-specific size. Thus, as exemplified in the illustrative embodiment, by performing in parallel the generation process by the information processing terminal 50 and the pre-printing process by the printer 10, it is possible to shorten the FPOT. Further, as exemplified in the illustrative embodiment, by performing in parallel the generation process by the information processing terminal 50 and a switching process (e.g., a process of switching the state of the power supply 11 from the dormant state to the drive state in S72) by the printer 10, it is possible to further shorten the FPOT. Further, in the illustrative embodiment, the printer 10 conveys an A4-size sheet along a short direction of the sheet. Therefore, it is possible to shorten a period of time from when the printer 10 begins to convey the sheet to when the printer 10 completes printing for a single page. Furthermore, the printer 10 is configured to perform the pre-printing process using a period of time for generating print data for sheet conveyance along the short direction. Thus, it is possible to shorten a period of time, including the FPOT, for completing printing of a single page.

Further, according to the illustrative embodiment, a notification provider (e.g., the display 23) provides a notification that the printer 10 has received the preparation instruction information (see e.g., S74). Consequently, it is possible to allow the user, who has issued an instruction to cause the printer 10 to perform the printing operation, to recognize that the printer 10 has started the printing operation.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

In the aforementioned illustrative embodiment, an example has been described in which each of the aforementioned various processes is executed by a processor (e.g., the CPU 31 and the CPU 61) executing a corresponding one of various programs (e.g., the computer programs 32A, the OS 64, the edit program 65, and the driver program 66) stored in a computer-readable storage medium (e.g., the ROM 32 and the memory 62) of the printer 10 or the information processing terminal 50. Nonetheless, each process may be executed in whole or part by one or more hardware elements (e.g., one or more processors, one or more ASICs, and a combination of one or more processors and one or more ASICs) in cooperation with each other. Namely, a controller according to aspects of the present disclosure may include one or more processors, one or more ASICs, or a combination of one or more processors and one or more ASICs.

Further, aspects of the present disclosure may be achieved not only as the printer 10 or the information processing terminal 50 but also as computer-readable instructions that cause the printer 10 or the information processing terminal 50 to perform each of the aforementioned various processes. The computer-readable instructions may be provided in a form stored in a non-transitory computer-readable medium. The non-transitory computer-readable medium may include, but is not limited to, RAMs, ROMs, flash memories, EEPROMs, CD-media, DVD-media, temporary storage, hard disk drives, floppy drives, permanent storage, and a storage device coupled with a server that is connectable with the printer 10 and the information processing terminal 50 via a communication network. The computer-readable instructions stored in the storage device coupled with the server may be delivered as information or signals representing the instructions via a communication network such as the Internet.

What is claimed is:

1. A printing system comprising:
 a printer; and
 an information processing device comprising:
  a first communication interface;
  a processor; and
  a memory storing processor-executable instructions and storing instructions for an operating system of the information processing device,
 wherein, in response to the processor accepting a user operation of instructing a printing operation, the operating system invokes the processor-executable instructions before transmitting print data to be printed by the printing operation;
 wherein the processor-executable instructions are configured to, when executed by the processor, cause the processor to perform:
  determining whether to instruct the printer to start a pre-printing operation based on preparation instruction, the preparation instruction being instruction to be transmitted to the printer in advance of an instruction to cause the printer to perform the printing operation;
  when determining to instruct the printer to start the pre-printing operation:
   transmitting the preparation instruction to the printer via the first communication interface; and
   transmitting notification of termination of processes of the processor-executable instructions to the operating system; and
  when determining not to instruct the printer to start the pre-printing operation, transmitting the notification of termination to the operating system without transmitting the preparation instruction to the printer,
 wherein the printer is configured to perform the pre-printing operation and the printing operation, the printer comprising:
  a second communication interface; and
  a controller configured to perform:
   receiving the preparation instruction from the information processing device via the second communication interface;
   controlling the printer to perform the pre-printing operation based on the received preparation instruction;
   receiving the print data from the information processing device via the second communication interface; and
   controlling the printer to perform the printing operation of the received print data.

2. The printing system according to claim 1,
 wherein the printer is configured to perform the pre-printing operation and the printing operation, and the printer comprises:
  an ink discharger configured to discharge ink droplets from a nozzle;
  a sheet conveyor configured to convey a sheet; and
  a power supply configured to supply to a drive power to the printer, wherein the pre-printing operation comprises at least one of:
  an uncapping operation of separating a cap for covering the nozzle away from the ink discharger;
  a flushing operation of causing the ink discharger to discharge ink droplets outside an area through which sheets is conveyed by the sheet conveyor; and
  a voltage boosting operation of boosting a supply voltage of the power supply to a target voltage for the printer.

3. A set comprising:
 a printer; and
 a non-transitory computer-readable medium storing processor-executable instructions that are executable by a processor coupled with a first communication interface and a memory storing instructions for an operating system,
 wherein, in response to the processor accepting a user operation of instructing a printing operation, the operating system invokes the processor-executable instructions before transmitting print data to be printed by the printing operation;
 wherein the processor-executable instructions being configured to, when executed by the computer processor, cause the processor to perform:
  determining whether to instruct the printer to start a pre-printing operation based on preparation instruction, the preparation instruction being instruction to be transmitted to the printer in advance of an instruction to cause the printer to perform the printing operation;
  when determining to instruct the printer to start the pre-printing operation:
   transmitting the preparation instruction to the printer via the first communication interface; and transmitting notification of termination of processes of the processor-executable instructions to the operating system; and when determining not to instruct the printer to start the pre-printing operation, transmitting the notification of termination to the operating system without transmitting the preparation instruction to the printer, wherein the printer is configured to perform the pre-printing operation and the printing operation, the printer comprising;

a second communication interface; and a controller configured to perform:

receiving the preparation instruction from the processor via the second communication interface;

controlling the printer to perform the pre-printing operation based on the received preparation instruction;

receiving the print data from the processor via the second communication interface; and controlling the printer to perform the printing operation of the received print data.

4. The set according to claim 3, wherein the printer is configured to perform the pre-printing operation and the printing operation, and the printer comprises:

an ink discharger configured to discharge ink droplets from a nozzle;

a sheet conveyor configured to convey a sheet; and a power supply configured to supply to a drive power to the printer, wherein the pre-printing operation comprises at least one of:

an uncapping operation of separating a cap for covering the nozzle away from the ink discharger;

a flushing operation of causing the ink discharger to discharge ink droplets outside an area through which sheets is conveyed by the sheet conveyor; and a voltage boosting operation of boosting a supply voltage of the power supply to a target voltage for the printer.

5. A non-transitory computer-readable medium storing processor-executable instructions that are executable by a processor coupled with an information processing device and a memory storing instructions for an operating system, wherein, in response to the processor accepting a user operation of instructing a printing operation, the operating system invokes the processor-executable instructions before transmitting print data to be printed by the printing operation;

wherein the processor-executable instructions being configured to, when executed by the processor, cause the processor to perform:

determining whether to instruct a printer to start a pre-printing operation based on preparation instruction, the preparation instruction being instruction to be transmitted to the printer in advance of an instruction to cause the printer to perform the printing operation;

when determining to instruct the printer to start the pre-printing operation:

transmitting the preparation instruction to the printer via a communication interface of the information processing device; and transmitting notification of termination of processes of the processor-executable instructions to the operating system; and when determining not to instruct the printer to start the pre-printing operation, transmitting the notification of termination to the operating system without transmitting the preparation instruction to the printer.

6. The non-transitory computer-readable medium according to claim 5, wherein the printer is configured to perform the pre-printing operation and the printing operation, and the printer comprises:

an ink discharger configured to discharge ink droplets from a nozzle;

a sheet conveyor configured to convey a sheet; and a power supply configured to supply to a drive power to the printer, wherein the pre-printing operation comprises at least one of:

an uncapping operation of separating a cap for covering the nozzle away from the ink discharger;

a flushing operation of causing the ink discharger to discharge ink droplets outside an area through which sheets is conveyed by the sheet conveyor; and a voltage boosting operation of boosting a supply voltage of the power supply to a target voltage for the printer.

7. The non-transitory computer-readable medium according to claim 5, wherein the printer performs the printing operation in accordance with an execution condition represented by condition information, wherein the processor-executable instructions are further configured to, when executed by the processor, cause the processor to perform:

determining whether the condition information includes trigger information, the trigger information representing a trigger for causing the printer to start the printing operation after receiving the print data;

in a case that determining that the condition information does not include the trigger information, determine to instruct the printer to start the pre-printing operation; and in a case that determining that the condition information includes the trigger information, determine not to instruct the printer to start the pre-printing operation.

8. The non-transitory computer-readable medium according to claim 5, wherein the information processing device further comprises the memory, wherein the processor-executable instructions are further configured to, when executed by the processor, cause the processor to perform:

storing the preparation instruction into a queue area of the memory, the queue area being configured to store one or more pieces of information to be transmitted by the operating system to the printer via the communication interface, with a transmission sequence being specified for the one or more pieces of information;

storing the print data into the queue area of the memory;

when there is not particular information stored in the queue area, determining to instruct the printer to start the pre-printing operation; and when there is particular information stored in the queue area, determining not to instruct the printer to start the pre-printing operation.

9. The non-transitory computer-readable medium according to claim 5,
wherein the processor-executable instructions are further configured to, when executed by the processor, cause the processor to perform:
generating print data based on specified contents data in a case that determining to instruct the printer to start the pre-printing operation and transmitting the preparation instruction to the printer;
generating print data based on specified contents data without transmitting the preparation instruction to the printer in a case that determining not to instruct the printer to start the pre-printing operation; and
transmitting the print data to the printer via the communication interface.

10. The non-transitory computer-readable medium according to claim 9,
wherein invoking of the processor-executable instructions represents that the operating system invokes a first function of the processor defined by first processor-readable instructions, the first function comprising causing the processor to perform:
determining whether to instruct the printer to start the pre-printing operation based on the preparation instruction; and
transmitting the preparation instruction to the printer when determining to instruct the printer to start the pre-printing operation.

11. The non-transitory computer-readable medium according to claim 10,
wherein a second function of the processor defined by second processor-executable instructions comprises causing the processor to perform:
generating print data based on specified contents data in a case that determining to instruct the printer to start the pre-printing operation and transmitting the preparation instruction to the printer; and
generating print data based on specified contents data without transmitting the preparation instruction to the printer in a case that determining not to instruct the printer to start the pre-printing operation.

* * * * *

UNITED STATES PATENT AND TRADEMARK OFFICE
CERTIFICATE OF CORRECTION

PATENT NO. : 10,805,498 B2
APPLICATION NO. : 16/366467
DATED : October 13, 2020
INVENTOR(S) : Kazutaka Yamada It is certified that error appears in the above-identified patent and that said Letters Patent is hereby corrected as shown below:

In the Claims

Column 26, Claim 3, Line 56 should read:
figured to, when executed by the processor, Signed and Sealed this
Twelfth Day of April, 2022

Drew Hirshfeld
*Performing the Functions and Duties of the
Under Secretary of Commerce for Intellectual Property and
Director of the United States Patent and Trademark Office*